US008935195B2

(12) United States Patent
Precup et al.

(10) Patent No.: US 8,935,195 B2
(45) Date of Patent: Jan. 13, 2015

(54) METHOD OF IDENTIFICATION AND DEVICES THEREOF

(75) Inventors: Doina Precup, Cote St. Luc (CA); Jordan Frank, Montreal (CA); Shie Mannor, Haifa (IL)

(73) Assignee: The Royal Institution for the Advancement of Learning/McGill University, Montreal (CA)

( * ) Notice: Subject to any disclaimer, the term of this patent is extended or adjusted under 35 U.S.C. 154(b) by 689 days.

(21) Appl. No.: 13/105,444

(22) Filed: May 11, 2011

(65) Prior Publication Data

US 2011/0282828 A1 Nov. 17, 2011

Related U.S. Application Data

(60) Provisional application No. 61/333,326, filed on May 11, 2010.

(51) Int. Cl.
*G06F 17/00* (2006.01)
*G06N 7/04* (2006.01)
*G06K 9/00* (2006.01)

(52) U.S. Cl.
CPC .................................. *G06K 9/00348* (2013.01)
USPC .......................................................... 706/54

(58) Field of Classification Search
None
See application file for complete search history.

(56) References Cited

U.S. PATENT DOCUMENTS

2007/0025722 A1* 2/2007 Matsugu et al. ............... 396/263
2011/0160927 A1* 6/2011 Wilson et al. .................. 700/291

OTHER PUBLICATIONS

"Detection, Classification, and Tracking of Targets"/ Dan Li, Kerry D. Wong, Yu Hen Hu, and Akbar M. Sayeed/ IEEE Signal Processing Magazine 17 1053-5888/02/$17.00©2002IEEE.*
"Principal Component Analysis" (Book, Springer-Verlag, 2002), Jolliffe.*
Frank Wood (NPL: "Principal Component Analysis", Dec. 8, 2009).*

* cited by examiner

*Primary Examiner* — Kakali Chaki
*Assistant Examiner* — Luis Sitiriche
(74) *Attorney, Agent, or Firm* — The Law Office of Michael E. Kondoudis

(57) ABSTRACT

Portable wireless devices are ubiquitous in modern society and many of these have integral sensors such as accelerometers, microphones, and Global Positioning Systems (GPS) that can collect data. This creates potential for intelligent applications to recognize the user, or aspects of the user and take appropriate action. According to embodiments of the invention there are presented techniques for representing such time series data which reduce the memory and computational complexity of performing the analysis and classifying the results. The techniques exploit time-delay embedding is to reconstruct the state and dynamics of an unknown dynamical system, Geometric Template Matching to build nonparametric classifiers, and algorithms to address the problem of selecting segments of data from which to build the time-delay models for classification problems.

18 Claims, 7 Drawing Sheets

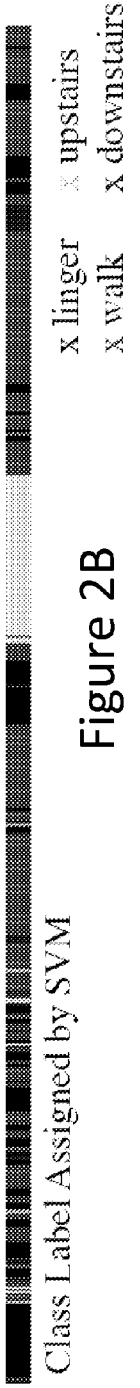
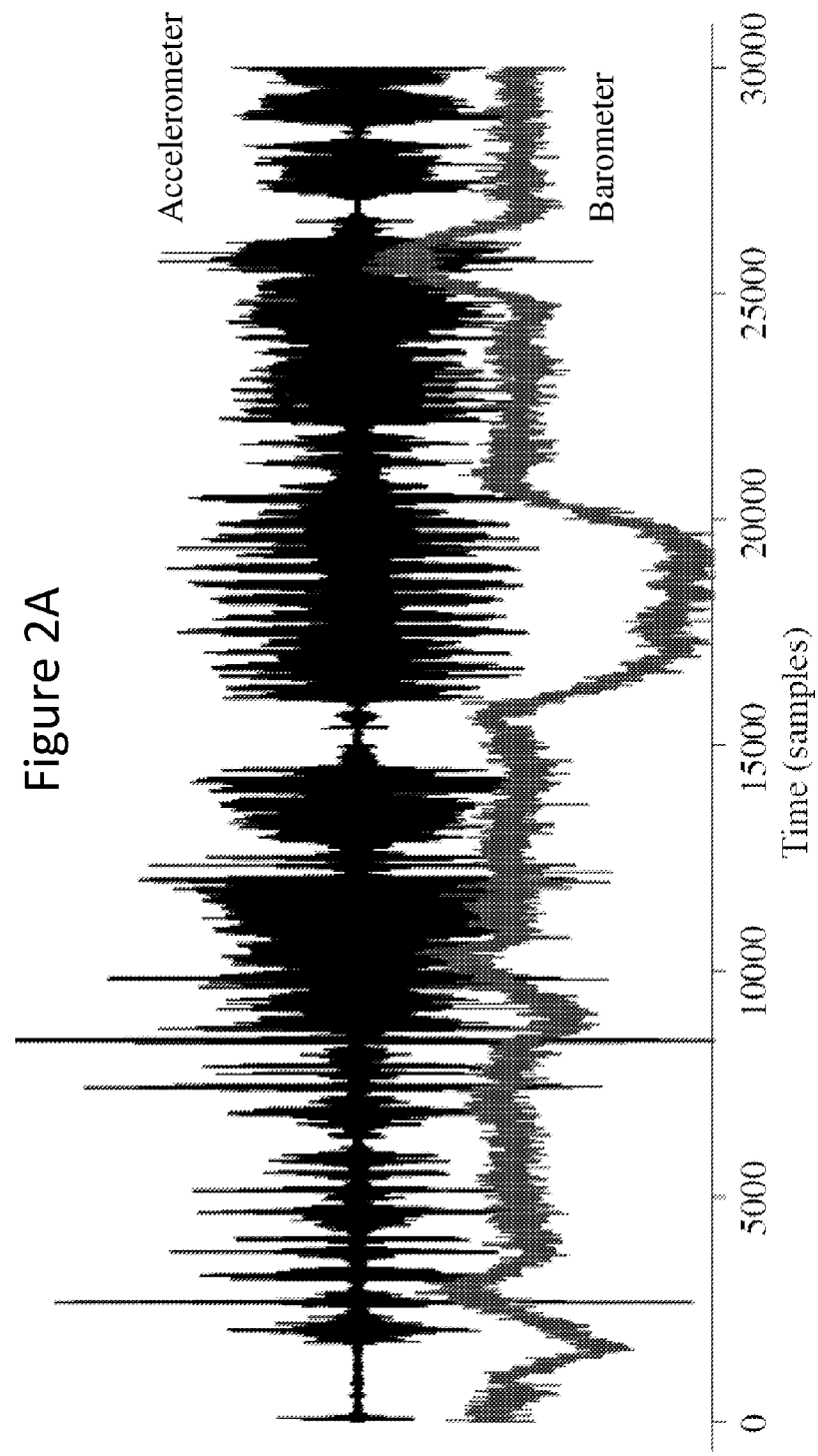
Figure 2B
Figure 2A

| Training | | Testing | | | | | | |
|---|---|---|---|---|---|---|---|---|
| | | User 1 | User 2 | User 3 | User 4 | User 5 | User 6 | Total |
| | User 1, simple | 77.26% | 75.61% | 76.94% | 77.86% | 78.55% | 75.90% | 77.11% |
| | User 1 | 87.89% | 82.66% | 84.29% | 86.73% | 85.76% | 84.67% | 85.27% |
| | User 2 | 85.95% | 84.35% | 84.04% | 86.59% | 86.04% | 85.50% | 85.49% |
| | User 3 | 86.28% | 82.98% | 85.08% | 87.03% | 85.99% | 85.07% | 85.44% |
| | User 4 | 86.00% | 82.69% | 84.11% | 89.41% | 85.56% | 86.12% | 85.79% |
| | User 5 | 86.15% | 82.89% | 84.06% | 86.24% | 86.61% | 83.83% | 85.04% |
| | User 6 | 86.29% | 83.48% | 83.85% | 87.56% | 85.56% | 87.75% | 85.83% |
| | | | | | | | Average: | 85.48±0.30% |

METHOD OF IDENTIFICATION AND DEVICES THEREOF

CROSS-REFERENCE TO RELATED APPLICATION

This patent application claims the benefit of U.S. Provisional Patent Application 61/333,326 filed May 11, 2010 entitled "Method of Identification and Devices Thereof."

FIELD OF THE INVENTION

This invention relates to time series data and more specifically to enhanced analysis techniques with reduced processing complexity.

BACKGROUND OF THE INVENTION

Mobile devices are ubiquitous in modern society. Many of these devices come equipped with sensors such as accelerometers and Global Positioning Systems (GPS) that can collect data about the movements of a user. This creates the potential of intelligent applications that recognize the user's activity and take appropriate action. For example, a device might notice that a user is in distress and alert a care giver, it might make decisions regarding whether incoming phone calls should be put through or saved in a message box, or it might monitor a user and provide information to a remote health database.

Applications for recognizing activities from sensor data have been developed in a wide range of fields such as health care, see for example Kang et al. in "A Wearable Context Aware System for Ubiquitous Healthcare" (IEEE Eng. in Medicine and Biology Society, 5192-5195 2006), fitness, see for example Lester et al in "A Practical Approach to Recognizing Physical Activities" (Lecture Notes in Computer Science 3968: pp 1-16), and security, see for example Kale et al in "A Framework for Activity-Specific Human Recognition" (Proc. Int. Conf. Acoustics, Speech, and Signal Processing, Vol. 706). Different types of sensors have been used, e.g., accelerometer data for recognizing physical activities, see for example Lester, and both mobile phone usage data, see for example Farrahi et al in "What Did You do Today? Discovering Daily Routines from Large-Scale Mobile Data" (Proc. ACM Int. Conf. on Multimedia, 849-852) and GPS data in Krumm et al in "Predestination: Inferring Destinations from Partial Trajectories" (Proc. Ubicomp, pp 243-260, 2006) and Liao et al in "Extracting Places and Activities from GPS Traces using Hierarchal Conditional Random Fields" (Intl. J. Robotics Res, Vol. 26(1), pp 119-134), and for analyzing human mobility and other higher-level, temporally extended activities, see for example Eagle et al in "Reality Mining: Sensing Complex Social Systems" (Personal and Ubiquitous Computing, Vol. 10(4), pp 255-268).

Previous work on this problem has shown recognition accuracy can be achieved, above 85%, but through the use of large and complex data sets, see for example Subramanya et al. in "Recognizing Activities and Spatial Context using Wearable Sensors" (Proc. Uncertainty in Artificial Intelligence) and Lester et al in "A Practical Approach to Recognizing Physical Activities" (Lecture Notes in Computer Science 3968, pp 1-16, 2006).

These existing approaches use standard, typically linear, signal processing methods, through which hundreds of signal statistics are computed. Feature extraction tools are then used to determine which of these features are useful for classification, these being what are referred to as "heavy-duty" applications in respect of their processing requirements. While these approaches work well, they require a lot of computing power, and accordingly are not well suited to real-time detection of activities using low-powered devices, including for example cellular telephones, personal digital assistants (PDAs), portable multimedia players, etc where battery lifetime is a major aspect of the devices usability to the user and the manufacturers and service providers marketing. Further these devices do not exploit high performance processors with high clock speeds, large associated RAM memory, and 64-bit processing.

It would therefore be beneficial to exploit an alternative method for representing time series data, such as derived from a GPS or accelerometer within a portable wireless device, which reduces the memory and computational complexity of performing activity recognition. Accordingly, the inventors have adopted nonlinear time series analysis techniques, see for example Kantz et al in "Nonlinear Time Series Analysis" (Cambridge University Press, 2003, ISBN 9780521821506) to extract features from the time series, and then use these extracted features as the inputs to an event classifier. It would also be beneficial for the technique to work with small data sets and accordingly the inventors present a novel approach for classifying time series data using nonparametric nonlinear models built from small data sets. Beneficially, this algorithm can be implemented and perform classification of activities in real time on existing portable wireless devices.

Considering current portable wireless devices then one sensor present within many such devices is an accelerometer, primarily intended for user input to specific activities such as computer games, re-orientating the device display, and providing directions. Considering the accelerometer data obtained then, intuitively, the acceleration recorded by the device is the result of a measurement performed on a nonlinear dynamical system, namely the user and consisting of the hips and legs, with their joints, actuations and interaction with the ground when moving without using the device, and additionally their arms and wrists when using the device. Amongst the approaches for reconstructing the essential dynamics of an underlying system using a short sequence of measurements, evenly spaced in time, is the time-delay embedding methods, see for example Sauer et al in "Embedology" (J. Stat. Phys., Vol. 65, pp 579-616, 1991).

Assuming that the dynamics of the underlying system, i.e. the user's body, are noticeably different when performing different activities then the parameters of the different time-delay embedding models can be used to classify new data either to the activity performed or to ascertain the user's identity. The inventors achieve classification performance, comparable to other state-of-art approaches, but by extracting a small number of features from the time series data, instead of the large number of features within these prior art approaches. Beneficially, the memory and computational savings are important, given that for many applications as discussed above this activity recognition would be running in real time as a small component of larger system on a low-powered mobile consumer electronics device.

Further, the inventors demonstrate the use of reconstructed coordinates in a time-delay embedding of a time series as input to a supervised learning algorithm for the subsequent time series classification. Whilst time-delay values have been used as inputs to neural networks, see for example Waibel et al. in "Phoneme Recognition using Time-Delay Neural Networks" (IEEE Trans. Acoustics, Speech and Signal Processing, Vol. 37, No. 3, pp 328-339), the inventors address the incorporation of noise-reduction techniques into the data and also the explicit treatment of the dynamics of the system from which the measurements are derived. As such the inventors have beneficially established a lightweight classification algorithm based on time-delay embeddings that is efficient and may be embedded to run real time on low-powered, low processor speed devices such as consumer portable electronic devices.

Time-delay embedding is an effective technique for creating models of periodic time series data, see for example Takens in "Detecting Strange Attractors in Turbulence" (Dynamical Systems and Turbulence, Vol. 898, pp 365-381). While time-delay embedding has been used extensively in the analysis of nonlinear dynamical systems, see for example Kantz and Sauer, their use in other fields is limited. The inventors in "Activity and Gait Recognition with Time-Delay Embeddings" (Proc. AAAI Conf. Artificial Intelligence, Paper SS-11-04. July 2010) presented an algorithm called Geometric Template Matching (GTM) for building nonparametric classifiers based on time-delay embedding models of time series.

GTM first builds time-delay models from short segments of time series data, chosen at random from the training data set. Subsequently, with an ensemble of K models derived from the data set, K features are extracted from a new segment of time series data by comparing the new segment with each of the K models. These models can be thought of as radial basis functions with a distance function that incorporates both spatial and temporal information. Extending on their own work by focusing on the interpretation of the GTM feature values as a measure of similarity, or, conversely, as a measure of distance the inventors have established algorithms exploiting the distance function based on GTM for unsupervised, supervised and semi-supervised learning of time series data that were generated as measurements from a latent, nonlinear dynamical system.

Such time series data and nonlinear dynamical systems arise in many scenarios, including but not limited to measurements of physiological phenomena, such as electrocardiography (ECG) or electroencephalography (EEG) recordings, to data captured from accelerometers or other wearable sensors. The inventors demonstrate that these clustering algorithms based on GTM achieve better results than other commonly used time series clustering approaches in the prior art, such as dynamic time warping (DTW) as taught by Berndt et al in "Using Dynamic Time Warping to Find Patterns in Time Series" (Proc. AAAI Workshop—Knowledge Discovery in Databases, pp 229-248, 1994).

Within the embodiments of the invention as described within this specification the inventors also address the problem of selecting segments of data from which to build the time-delay models for classification problems. In prior work of the inventors the segments were selected uniformly randomly from the training data. The extension within the embodiments of the invention exploits an alternative approach based on boosting, see for example Freund et al in "A Decision Theoretic Generalization of On-line Learning and an Application to Boosting" (J. Computer and System Sciences, Vol. 55, pp 119-139, 1997), that adaptively builds models throughout the training process with the beneficial aspect of focusing on data segments where the classifier is performing poorly. Beneficially these extensions of time-delay models are compatible with the constraints of running in real time as a small component of larger system on a low-powered mobile consumer electronics device

SUMMARY OF THE INVENTION

It is an object of the present invention to time series data and more specifically to enhanced analysis techniques with reduced processing complexity.

In accordance with an embodiment of the invention there is provided a method comprising:
receiving at a computer system time series data;
generating with the computer system a time-series data segment comprising a predetermined portion of said time series data;
generating with the computer system time-delay data, the time-delay data being a time-delay embedded representation of the time-series data segment; and
processing with the computer system the time-delay data with a classifier to generate at least a score of a plurality of scores, each score relating to a measure of the match of the time-delay data to a model of a plurality of models.

In accordance with an embodiment of the invention there is provided a non-transitory tangible computer readable medium encoding a computer program, the computer program for execution by a computer system, the computer program relating to a method comprising:
receiving at a computer system time series data;
generating with the computer system a time-series data segment comprising a predetermined portion of said time series data;
generating with the computer system time-delay data, the time-delay data being a time-delay embedded representation of the time-series data segment; and
processing with the computer system the time-delay data with a classifier to generate at least a score of a plurality of scores, each score relating to a measure of the match of the time-delay data to a model of a plurality of models.

In accordance with an embodiment of the invention there is provided a method comprising providing a classifier, the classifier for generating a score relating to a measure of a match of time-delay data to a model of a plurality of models wherein the time-delay data is a time-delay embedded representation of a time series data segment.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2 depicts classification results on a segment of the data from a user using a classifier trained on another user according to an embodiment of the invention together with the sampled data relating to the magnitude of the accelerometer data and gradient of the barometric pressure;

DETAILED DESCRIPTION

Figure 1B:
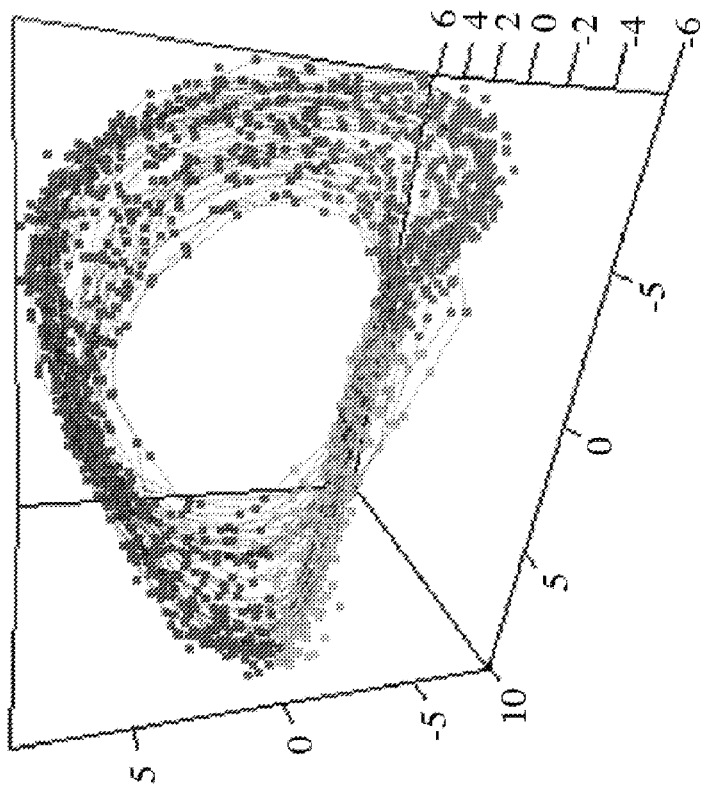
FIG. 1B depicts time-delay embedding according to an embodiment of the invention.

The present invention is directed to time series data and more specifically to enhanced analysis techniques with reduced processing complexity.

A: Time-Delay Embedding:

The concept behind time-delay embedding is to reconstruct the state and dynamics of an unknown dynamical system from measurements or observations of that system taken over time. The state of the dynamical system at time t is a point $x_t \in \Re^k$ containing all the information necessary to compute the future of the system at all times following t. The set of all states is called the phase space. It would be evident that generally the state of the system cannot be measured directly, and even the true dimension of the phase space k is typically unknown. However, we assume access to a time series $\langle o_t = \omega(x_t) \rangle$ generated by a measurement function $\omega: \Re^k \to \Re$, which is a "smooth" map from the phase space to a scalar value. "Smooth" meaning that the mapping from phase space to scalar values is continuously differentiable.

In general, it is hard to reconstruct the state just by looking at the current observation. However, by considering several past observations taken at times t, $t-\delta_1, \ldots t-\delta_{m-1}$, the reconstruction should be easier to perform. These m measurements can be considered as points in $\Re^m$, which is called the reconstruction space. The key problem is to determine how many measurements m have to be considered, i.e. what is the dimension of the reconstruction space, and at what times they should be taken, i.e. what are the values of $\delta_i$ in order to capture with sufficient detail the system dynamics.

In particular, if we consider the map from $\Re^k$ to $\Re^m$, which corresponds to taking the measurements and then projecting the time series data into the reconstruction space, we would like this mapping to be one-to-one and to preserve local structure. If this were the case, by looking at the time series in $\Re^m$, one would essentially have all the information from the true system state and dynamics.

We consider the time-delay reconstruction in m dimensions with time delay t, which is formed by the vectors $O_t \in \Re^m$, defined as $O_t = (o_t, o_{t+\tau}, o_{t+2\tau}, \ldots, o_{t+(m-1)\tau})$. We assume that the true state of the system $x_t$ lies on an attractor $A \subset \Re^k$ in an unknown phase space of dimension k. We use the term "attractor", as in dynamical system theory, to mean a closed subset of states towards which the system will evolve from many different initial conditions. Once the state of the system reaches an attractor, it will typically remain inside it indefinitely, in the absence of external perturbations. An embedding is a map from the attractor A into reconstruction space $\Re^m$ that is one-to-one and preserves local differential structure. Takens (1981) showed that if A is a d-dimensional smooth compact manifold, then provided that $m > 2d, \tau > 0$, and the attractor contains no periodic orbits of length that are integer multiple of $\tau$ then for almost every smooth function $\omega$, the map from $\Re^k$ to the time-delay reconstruction is an embedding. In other words, any time-delay reconstruction will accurately preserve the dynamics of the underlying dynamical system, provided that m is large enough and $\tau$ does not conflict with any periodic orbits in the system.

However, from the point of view of activity recognition, we would like m to be as small as possible, as it determines the minimum time interval after which an activity can be recognized. More precisely, if the data is sampled at a rate of r measurements per second, then the time window needed for the time-delay reconstruction is $((m-1)\tau)+1/r$ seconds. Takens' theorem only holds when the measurement function $\omega$ is deterministic, but in practice all measurements are corrupted by noise from a variety of sources, ranging from the measurement apparatus itself to rounding errors due to finite precision in mathematical calculations performed. In the presence of noise, the choice of m and $\tau$ becomes very important. There are a number of techniques for choosing good values for m and $\tau$ based on geometrical and spectral properties of the data, see for example Buzug et al in "Optimal Delay Time and Embedding Dimension for Delay-Time Coordinates by Analysis of the Global Static and Local Dynamical Behavior of Strange Attractors" (Phys. Rev. A, Vol. 45(10), pp 7073-7084).

However, the inventors have found that performing a grid search over a small parameter space, using a small validation data set and optimizing classification accuracy on it, suffices to find good parameters. Methods developed for nonlinear time series analysis have not been widely used in the machine learning community, but are quite popular in other areas of research. In the following section, we explain how we use time-delay embeddings for the purpose of classifying time series data.

A1: Methodology:

According to embodiments of the invention the methodology is to initially extract features using time-delay embedding, perform a noise-reduction step, and use these features as input to a classifier. We shall define a time-delay embedding function $T(o,m,\tau)$ which takes as parameters a time series $o = \langle o_i \rangle_{i=1}^N$, and the time-delay embedding parameters m and $\tau$. Let $M = N - (M-1)\tau$. The function T returns an $m \times M$, matrix O whose $i^{th}$ column is the $i^{th}$ time-delay vector $(o_i, o_{i+\tau}, o_{i+2\tau}, \ldots, o_{i+(m-1)\tau})$.

For the noise reduction step, principal component analysis (PCA) is performed on the embedding of a short segment of the training data, see for example Jolliffe in "Principal Component Analysis" (Springer-Verlag, 2002). PCA computes a projection matrix P from the time-delay embedding space to a space of lower dimension p, which we will call model space. Once the projection matrix P has been computed, any sequence of observations can be projected into the model space by computing the time delay embedding, centering the data by subtracting its mean, then multiplying by P.

Figure 1A:
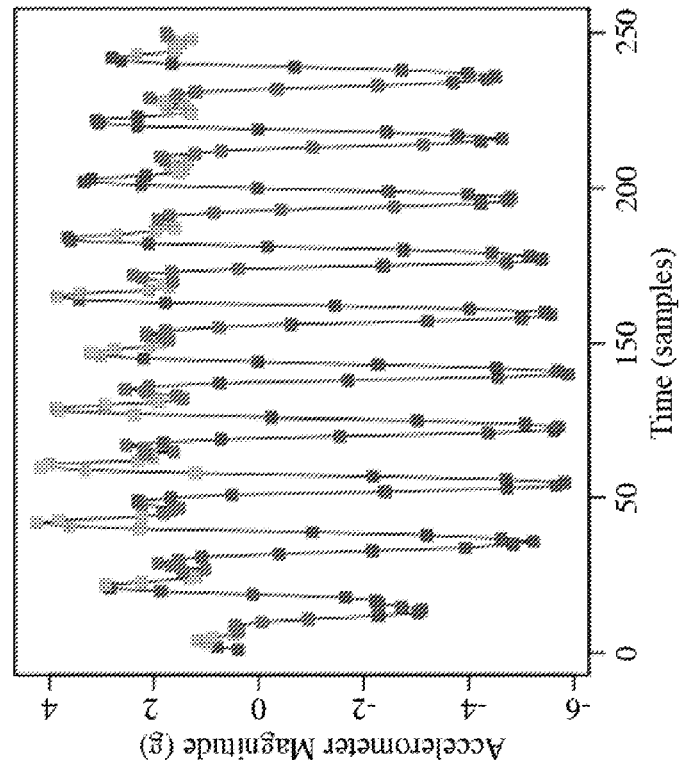
FIG. 1A depicts exemplary raw accelerometer data as an example of time-delay embedding for accelerometer data obtained from monitoring a biking activity for an individual.

FIG. 1 illustrates the concept of time-delay embedding using accelerometer data collected from a subject riding a stationary bicycle. On the left in FIG. 1 is a short segment of the raw acceleration data that was used to find the projection, P. Using time-delay embedded data, with $m=6, \tau=11$, and $p=3$ (chosen based on previous experiments), results in the right hand plot of FIG. 1 which presents the result of embedding the entire data set and then projecting onto the basis specified by P. It can be seen that the system evolves along a set of tightly clustered trajectories, in a periodic fashion. This is quite intuitive, considering that cycling involves a periodic, roughly two-dimensional leg movement. However, it is remarkable that this structure can be reconstructed automatically from the time series on the left, especially since the data is non-stationary (i.e., the peaks do not have the same magnitude, and the period varies over time). Given a sequence of observations, the computation described above will produce a matrix whose columns form a sequence of points in the p-dimensional Euclidean model space, representing the states of the dynamical system, which we refer to within this specification as a model.

A2: Geometric Template Matching Algorithm:

The geometric template matching (GTM) algorithm is an efficient algorithm for assessing how well a given time series matches a particular model, see for example the inventors in "Activity and Gait Recognition with Time-Delay Embeddings" (Proc. AAAI Conference on Artificial Intelligence, 2010). The time series data is projected into model space, then short segments of the projected data are compared geometrically against their nearest neighbours in the model. Subsequent pairs of points in the model space are referred to as vectors. In the comparison segments of the projected data set that are geometrically similar to nearby vectors in the model are given higher scores, while segments that differ from the model are given low scores.

Consider a univariate time series $o = \langle o_i \in \Re \rangle_{i=1}^T$ of length T, assumed to represent a sequence of observations of some nonlinear dynamical system. Let F be a function of o, a time index t, and time-delay parameters m and $\tau$, as defined in Equation (1).

$$F(o,m,\tau,t) = (o_t, o_{t+\tau}, o_{t+2\tau}, \ldots, o_{t+(m-1)\tau}) \quad (1)$$

The function F represents the state of the system at time t by an m-length vector of $\tau$-lagged measurements. Given a time series o, the time-delay reconstruction of o is given by the set u (Equation 2) of points in $\Re^m$.

$$u = [u_i = F(o,m,\tau,i)]_{i=1}^{T-(m-1)\tau} \quad (2)$$

We refer to u as the model for the sequence o. In the preceding work by the inventors an additional noise-reduction step, based upon projecting the model onto a subset of its principal components, was included. In the following analysis, due to generally producing poorer results, this step is omitted.

To compare the time series $o = \langle o_i \rangle_{i=1}^N$ with another time series $o' = \langle o'_i \rangle_{i=1}^{N'}$, the GTM algorithm starts by forming time-delay reconstructions $u = [u_i]_{i=1}^M$ and $u' = [u'_i]_{i=1}^{M'}$ for o and o' respectively, using the same time-delay parameters m and $\tau$. Denoted by $n_1(u'_i), \ldots, n_k(u'_i)$ the indices in u of the k nearest neighbours of $u'_i$, in terms of Euclidean distance as specified in Equation 3.

$$n_1(u'_i) = \arg\min_j \|u'_i - u_j\|, n_2(u'_i) = \arg\min_{j \neq n_1(u'_i)} \|u'_i - u_j\|, \text{etc} \quad (3)$$

Letting $\overline{u_i} = \text{mean}(u_{n_1(u'_i)}, \ldots, u_{nk(u'_i)})$ and $\overline{u_{i+1}} = \text{mean}(u_{n_1(u'_i)+1}, \ldots, u_{nk(u'_i)+1})$ represent the mean of the k nearest neighbours of $u'_i$ in u and the mean of the subsequent points in u, then the similarity between models u and u' is defined by Equation (4).

$$S(u, u') = \frac{1}{M'-1} \sum_{i=1}^{M'-1} \frac{(\overline{u_{i+1}} + \overline{u_i}) \cdot (u'_{i+1} - u'_i)}{\max(|\overline{u_{i+1}} - \overline{u_i}|, |u'_{i+1} - u'_i|)^2} \quad (4)$$

where |x| denotes the vector norm and • the vector dot-product.

Each term in the sum computes the cosine between a vector formed by subsequent points in u' and the "average" of nearby vectors formed by subsequent points in u, multiplied by the ratio of the smaller of the two vectors to the larger of the two vectors. Therefore, $-1 \leq S(u,u') \leq 1$. It should be noted that the similarity scores are not symmetric, that is to say $S(u,u') \neq S(u',u)$, in general, and unless k=1, $S(u,u)<1$ due to the effect of averaging over nearest neighbours. To convert this measure of similarity to a measure of distance, we define $d(u,u') = \exp(-S(u,u'))$.

Accordingly we employ an algorithm, Algorithm 1, which takes as input a time series and a model, and computes nearest-neighbours for the time series based on Euclidean distance. A set of scores for each segment of the time series is returned as a result. Within the algorithm, we denote the Euclidean norm by |u|, and the dot product of two vectors by u•v. For notational convenience we write the vector going from point a to point b as [a,b]. For simplicity and for classification purposes, one can simply assign to the sequence the class label associated with the model that obtains the highest average score.

It would be beneficial in many applications for the classification to be performed in real-time, as well as for example being executed on computationally "poor" platforms, i.e. those with for example limited processor speed, memory, etc, as opposed to using batch input and delayed processing on computationally "rich" systems. Accordingly, the inventors maintain a buffer of the most recent $(m-1)\tau+s$ samples, such that the GTM algorithm is run on the buffered data resulting in one iteration of the outer loop, and thus one score, as new data becomes available.

Within the experiments performed by the inventors, using a cellular telephone, the inventors have been able to compute a score for 8 models twice per second using the embedding parameters m=12, $\tau$=2, p=6, s=32, and n=4, with no noticeable impact on the performance of the cellular telephone.

---

Algorithm 1 Geometric Template Matching

Input: Model $u = \langle u_i \rangle_{i=1}^N$, parameters (m, $\tau$, p, P), sequence length s, neighbourhood size n, and the sequence to score, $o = \langle o_i \rangle_{i=1}^T$.
Output: A set of scores, $r_1, \ldots, r_{T-(m-1)\tau-s} \in [-s, s]$.
  1. Initialize the score, $r_i = 0$ for i = 1,...,(M − s) .
  2. Compute matrix V that represents the model for sequence o, whose columns form the sequence $\langle v_i \rangle_{i=1}^M$, where M = T − (m − 1)$\tau$.
  3. Repeat for i = 1,...,(M − s):
        Repeat for j = 1,...,(i + s + 1):
        a. Let $w_1, \ldots, w_n$ be the indices of the n nearest neighbours of $v_j$ in u.
        b. Let U be the mean of the vectors $[u_{w1}, u_{w1+1}], \ldots, [u_{wn}, u_{wn+1}]$,
        c. Let V be the vector $[v_j, v_{j+1}]$.
        d. Update the score, $r_i = r_i + (U • V)/\max(|U|,|V|)$.
  4. Return the scores, $r_1, \ldots, r_{T-(m-1)\tau} − s$.

A3: Activity Recognition:

Amongst the experiments performed by the inventors to demonstrate the algorithm m was one of activity recognition using data collected using the Intel Mobile Sensing Platform (MSP), see Choudhury et al. in "The Mobile Sensing Platform: An Embedded Activity Recognition System" (IEEE Pervasive Computing, Vol 7, No. 2, pp 32-41). The MSP contains a number of sensors including a 3-axis accelerometer and a barometric pressure sensor. Six participants were outfitted with the MSP units, which clip onto a belt at the side of the hip, and data was collected from a series of 36 two-hour excursions (6 per user) which took place over a period of three weeks. The participants were accompanied by an observer who recorded the labels as the activities were being performed. The labels were: walking, lingering, running, upstairs, downstairs, and riding in a vehicle.

In the analysis presented within this specification the vehicle activity has been omitted as only the accelerometer and barometric pressure data were employed, and not the GPS signal of the MSP. Taking into account equipment failures and data with obvious errors in the labelling, the working data set consists of 50 hours of labeled data, roughly equally distributed among the six participants. The accelerometer data is sampled at 512 Hz, but was down sampled to 32 Hz in this analysis. The accelerometer data consists of three measurements at each time step, corresponding to the acceleration along each of the three axes, x, y, and z. Representative data for one user, User 6, in respect of accelerometer and barometer pressure information is shown in FIG. 2A. It would be evident to one skilled in the art that time-series data from a dedicated system such as the MSP is very different in noise, resolution, reproducibility, etc to that obtained with low cost high volume devices based upon consumer electronics.

We combine these three measurements to form a single measure of the magnitude of the acceleration vector $a = \sqrt{x^2 + y^2 + z^2} - g$, where $g = 9.8$ ms$^{-2}$ is the Earth's gravity. Subtracting g causes the acceleration when the device is at rest or moving at a constant velocity to be 0. The barometric pressure was sampled at 7.1 Hz, smoothed, and then up sampled to 32 Hz. The gradient of this signal is used as an additional feature. The data was initially split into six parts, each containing the data from a specific participant, and then all of the accelerometer data was projected into a time-delay reconstruction space with parameters $\tau = 3$ and $m = 16$. For each user, a training set was constructed by selecting randomly 25% of these embedded data points, corresponding to approximately 2 hours of data, or 230,000 samples for each participant. Subsequently, PCA was performed on the data points in the training set followed by projecting all the reconstructed accelerometer data onto the principal components corresponding to the 9 largest eigenvalues from the training data. This produces 9 features for each data point in the original time series, which were then combined with the barometric pressure to form the input features for a Support Vector Machine (SVM) classifier, see for example Cristianini et al in "An Introduction to Support Vector Machines: and other Kernel-based Learning Methods (Cambridge University Press, 2000). Also, to provide a basis for comparison of the approach according to an embodiment of the invention, an SVM was also trained using the raw accelerometer value and gradient of the barometric pressure as inputs at each time step.

Figures 3, 4:
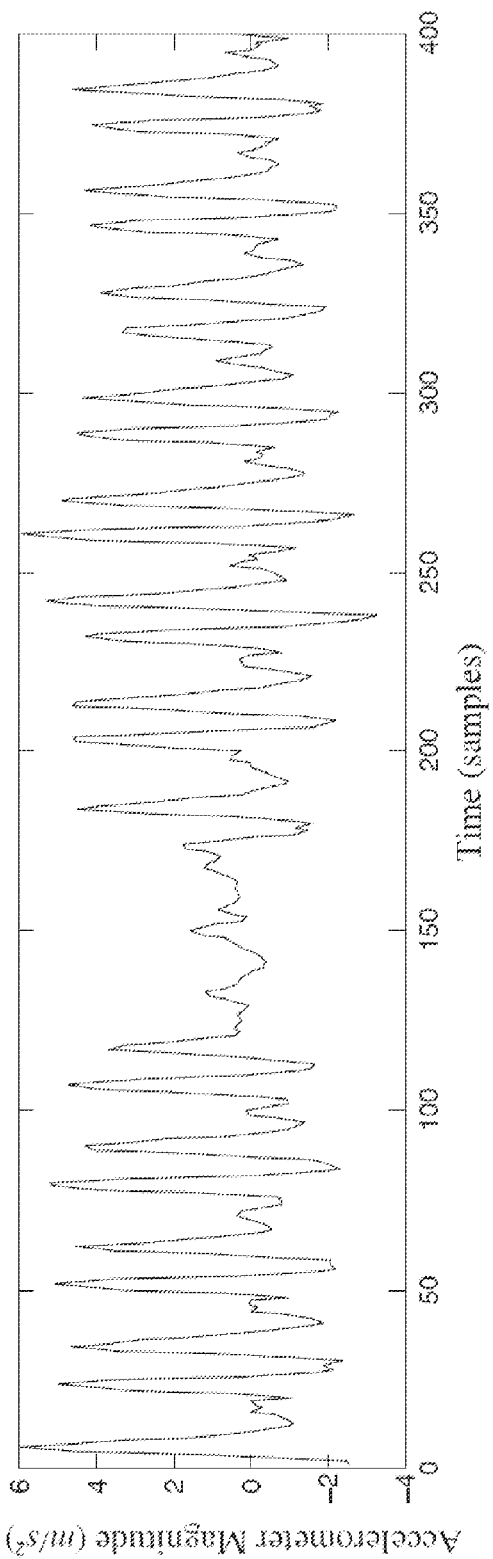
FIG. 3 depicts an exemplary segment of accelerometer data from a user.
FIG. 4 depicts results for activity recognition using an analysis technique according to an embodiment of the invention.
Figure 5:
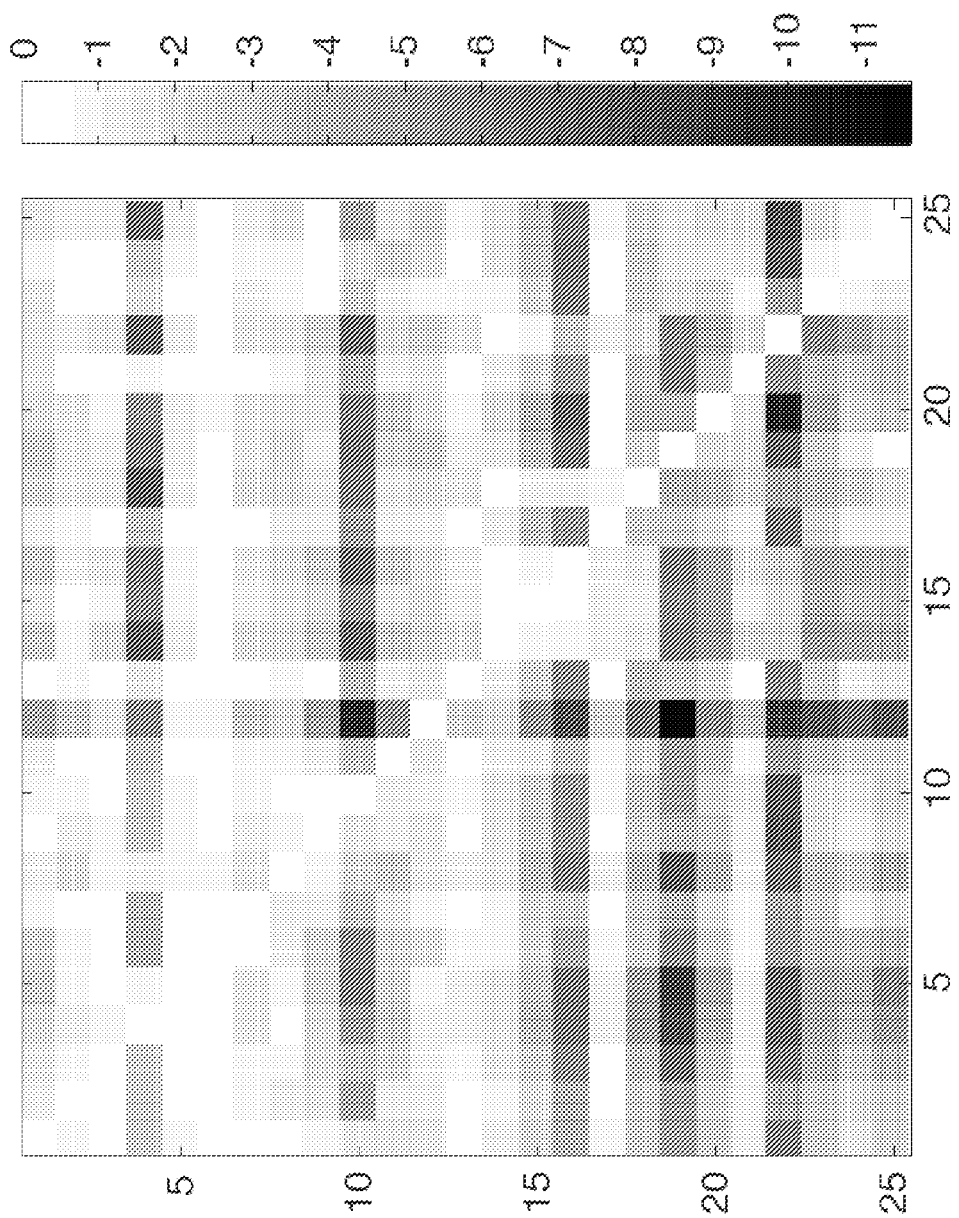
FIG. 5 depicts scores obtained for a gait recognition task using an analysis technique according to an embodiment of the invention.

Each classifier was tested on the entire data set for each user yielding the results depicted in FIG. 4. The first row contains the results when training using only the single raw accelerometer value and the gradient of the barometric pressure, trained on data from User 1, and testing on all of the users. The subsequent rows show the results according to an embodiment of the invention wherein the SVM was trained for each user and then tested on all users. As such it can be seen in FIG. 3 that the analysis algorithm according to an embodiment of the invention, using features obtained by time-delay embedding of the original raw data, significantly improves the classifier performance.

FIG. 2B shows the result of using the SVM trained on User 3 to label a segment of the data for User 6, the data being shown in FIG. 2A. The classifier performs well across all users, regardless of the user on which it was trained. The average accuracy for the experiments using the time-delay embedding on the entire data set is approximately 85%. This demonstrates that these features are useful for activity recognition devices, because the system can be calibrated on one user, then deployed to other users, and the performance is very similar. The accuracy reduction from using another user for calibration versus the actual user as shown in FIG. 3 is approximately between 1% and 5%.

A4: Gait Recognition:

Gait recognition is the problem of identifying a person by their manner of walking, or carriage. The problem of gait recognition has been studied in depth in the computer vision and biomechanics communities, where the goal is to identify an individual based on a sequence of images or silhouettes captured while the individual is walking, see for example Nixon et al in "Human Identification based on Gait" (Springer, 2006, ISBN 978-0-387-24424-2). Recent work has considered gait recognition using wearable sensors as a means for biometric identification, see for example Gafurov et al in "Gait Authentication and Identification using Wearable Accelerometer Sensor" (IEEE Workshop Automatic Identification Advanced Technologies, pp 220-225, June 2007, ISBN 1-4244-1300-1). For the experiments presented below the data collection and analysis tool was configured to execute upon the Google Android operating system, and loaded onto a HTC G1 cellular telephone. Within the experiments, the HTC phone was placed in the front trouser pocket of an individual, and collected data from the 3-axis accelerometer embedded within the HTC phone at a rate of 25 Hz as the subject walked. Data was collected for a set of 25 traces, each containing between 12 and 120 seconds of continuous walking data from one of 25 individuals.

This data was trimmed to remove any time before and after the walk as well as the first and few steps, but otherwise no other post-processing of the accelerometer data was performed. FIG. 4 depicts a short sequence from the HTC phone from one of the data sets. As is evident, the data set is noisy, and there is significant variability in the signature for each cycle of the walk. In addition, the subjects were asked to walk to one end of a hall and back, which required them to turn 180°. This leads to a few cycles of the walk that are substantially different than the others, as evident from samples 120-160 in FIG. 4.

Each data set was split into a training and test set. Since the data is sequential, a single block of data of a fixed length was chosen for the test set, and the remaining data was used as the training set. While this adds a single point of discontinuity in the training set when the test set is not at the very beginning or end of the data set, the inventors have observed that this does not have a noticeable effect on the results. Time-delay embedding models were constructed for each of the training sets with dimension $m = 12$, delay time $\tau = 2$ and projected dimension $p = 6$. The number of nearest neighbours considered in each model was 4. These parameters were chosen based on previous experiments, before this data set was collected, but alternatively may have been derived from performing trials upon the data without any prior knowledge.

Each test set was then compared to each model. For each test set, S, and model, T, the test set S was projected into the model-space for T, and then every segment of length 32 samples was compared to the model T as described in the section above. The scores for each segment were then averaged to give a score for how well each model T matched the data in S. This was repeated 5 times with 5 different tests and training sets to obtain 5-fold cross-validation. The scores were then averaged across the 5 runs. Accordingly, the algorithms according to an embodiment of the invention achieved 100% accuracy on the test set: every test set was associated with the correct user model.

A5: Discussion:

The results presented above exhibit good accuracy, despite the fact that they use significantly fewer features than are generally used for time series analysis based on signal processing techniques in the prior art. For the gait recognition task, the method according to an embodiment of the invention exploited a time window of only 22 samples. The average walking cycle has a period of approximately one second, and so for a 1 Hz signal to be detected confidently using any prior art method that computes the spectrum of the data, hundreds of samples must be considered.

It is evident that the activity recognition results presented above use significantly fewer features than prior art approaches without reducing accuracy. To provide some comparison, a similar data set was considered by Subramanya et al. in "Recognizing Activities and Spatial Context using Wearable Sensors" (Proceedings 22$^{nd}$ Conference on Uncertainty in Artificial Intelligence, pp 494-502, 2006) who applied the methods proposed by Lester et al in "A Practical Approach to Recognizing Physical Activities" (Lecture Notes in Computer Science, No. 3968, pp 1-16, 2006) and achieved an accuracy of 82.1% on the same set of activities considered above. However, their system used 650 features of the time series, composed of cepstral coefficients, FFT frequency coefficients, spectral entropy, band-pass filter coefficients, correlations, and a number of other features that it would be evident to one skilled in the art require a non-trivial amount of computation.

A modified version of AdaBoost was then used to select the top 50 features for classification. In comparison the solution presented supra by the inventors in respect of an embodiment of the invention used 16 samples of the raw signal, corresponding to a window of 48 samples, or one and a half seconds, and then computed a linear projection to get the 9 features that are used to train the classifier. It should be noted that the two sets of results were obtained on different data sets, but the work of Subramanya is referenced as it is the closest in nature to the work presented in respect of the invention. It is not claimed that the method according to an embodiment of the invention obtains better results, rather that the features required are considerably easier to compute yet result in similar classification accuracy.

The accuracy figures presented in FIG. 4 can be improved with further post processing, because as can be seen in FIG. 2B, most of the mislabeled segments are those of short duration. State of the art activity recognition systems routinely perform temporal smoothing, which reduces such errors. As a test of this approach the inventors aggregated sequences of 8 predictions and took a majority vote at ¼ second intervals (instead of making 32 separate predictions every second), matching the rate of existing activity recognition systems, see Lester et al. Using this approach, the error rate decreased by between 2-4%, depending on the particular experiment.

However, in this specification we wish to concentrate on the power of the representation, and not try to exploit other methods to mitigate errors. Whilst the discussion and examples presented above exploited the SVM classification approach it should be noted that this selection was based upon one of expediency of off-the-shelf software code being available. Alternative classification methods, such as the decision stumps classifiers used by Lester or the semi-supervised conditional random fields (CRFs) used by Mandaviani et al in "Fast and Scalable Training of Semi-Supervised CRFs with Application to Activity Recognition" (Proceedings of Neural Information Processing 2007, Poster T48), would it is anticipated lead to increased performance.

For the gait recognition task, we were able to perfectly classify the 25 individuals, with short samples of data using software embedded as an application upon a computationally "poor" device, a cellular telephone. Referring to FIG. 4 there are shown the scores for each test set when compared to each model. The shading in the $i^{th}$ row and $j^{th}$ column depicts the difference between the average score for test set i with model j and the maximum average score for any of the test sets under model j, in terms of empirical standard deviations. The white squares represent the maximum average scores. Although the maximum scores lie on the diagonal, for many of the test sets a large number of the models obtain scores that are close to the maximum score. For example, the difference between the highest and lowest average score for test set 6 is only 1.05 empirical standard deviations. On the other hand, for some test sets, such as test sets 10 and 22, the classifier clearly identifies the correct model.

Whilst other authors have considered using wearable sensors to perform gait recognition due to the personal nature of these data sets, they are not publicly available, and accordingly we can only offer a qualitative comparison. Gafurov et al in "Gait Authentication and Identification using Wearable Accelerometer Sensor" (IEEE Workshop on Automatic Identification Advanced Technologies, pp 220-225, 2007) analyzed a data set consisting of data collected from 50 individuals. They reported a recognition rate of 86.3% using features that were hand-crafted for the gait recognition task. We also note that the sensors that they used were special-purpose motion sensors, and had both higher sampling rate and reduced noise than the sensors that we employed which were the standard sensors embedded within a mass production consumer portable wireless device, i.e. a cellular telephone. The method taught according to embodiments of the invention offers comparable or better performance, despite not being designed for this particular task, with low cost standard consumer electronic devices and software embedded onto such devices.

B: Clustering, Classification, and Semi-Supervised Learning:

Within the descriptions presented supra in respect of the geometric template matching (GTM) algorithm the emphasis has been to exploiting time-delay embedding in the preparation of the data provided to the classifier and the robustness of such systems to different training sets such that a device can be provided to the user with a pre-installed training set allowing them to use the device immediately rather than requiring them to establish the training set under controlled conditions. Further, the embodiments are intended for use in computationally "poor" systems thereby allowing them to be embedded into a wide variety of consumer electronics including but not limited to cellular telephones, PDAs, and portable multimedia players but also to be embedded into other existing systems and new systems without requiring expensive computational infrastructure.

B1: Clustering ECG Data:

To demonstrate the use of GTM for clustering periodic time series the inventors considered a dataset composed of 40 two-minute ECG time series from the PhysioNet ECG database, see Goldberger et al in "PhysioBank, PhysioToolkit, and PhysioNet: Components of a New Research Resource for Complex Physiologic Signals" (Circulation, 101(23), e215-e220, 2000). This dataset being chosen because it has previously been used as a clustering benchmark by Kalpakis et al in "Distance Measures for Effective Clustering of ARIMA Time-Series" (Proc. IEEE Intl. Conf. Data Mining. pp. 273-280, 2001).

Kalpakis et al, the authors, reported using several distance measures and performed hierarchical clustering with the goal of separating the 18 traces that correspond to normal sinus rhythm from the 22 traces taken from patients with malignant ventricular arrhythmia. The authors considered distance measures based on differences in coefficients from discrete Fourier transforms (DFT), discrete wavelet transforms (DWT), projections onto principal components (PCA), and their own approach based on Linear Predictive Coding (LPC) cepstrum. The LPC cepstral distance is similar to GTM in that it involves fitting a dynamical model to the data, but unlike GTM, it uses linear modeling. The best reported performance on the ECG data was achieved using the FFT and autocorrelation coefficients, which grouped 3 malignant traces in with the normal traces, and 1 normal trace in with the malignant traces.

Accordingly, the inventors developed one time-delay models for each of the 40 traces using parameters $m=7$ and $\tau=11$ according to an embodiment of the invention. These parameters were chosen using the false nearest neighbours technique, see Kantz. The similarity matrix S was then determined using GTM and converted to a distance matrix, $D=\exp(-S)$. For the example presented here asymmetry was ignored and only the lower triangular portion of D employed. Based upon this hierarchical clustering was performed, see Johnson in "Hierarchical Clustering Schemes" (Psychometrika, 32(3), pp 241-254, 1967), with Ward's minimum-variance criteria for cluster merging, see Ward "Hierarchical Grouping to Optimize an Objective Function" (J. American Statistical Association, 58, pp 236-244, 1963).

Figure 6:
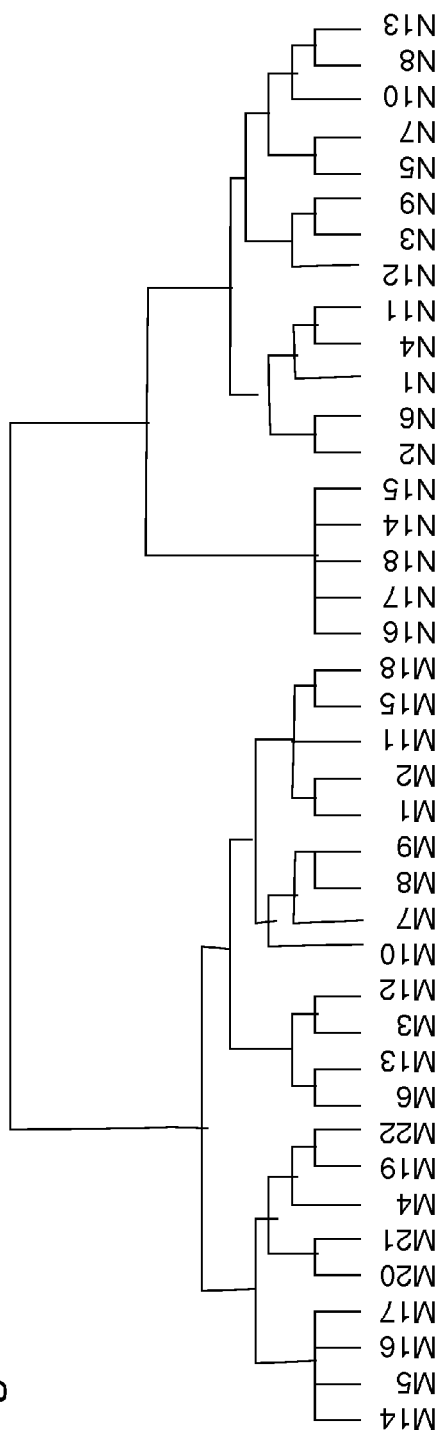
FIG. 6 depicts a clustering dendrogram for ECG data according to an embodiment of the invention.

The resulting cluster dendrogram is shown in FIG. 6 wherein two clearly separated clusters, one containing only malignant samples (labeled Mx) and the other containing only normal samples (Nx). Although the raw data for some of the malignant samples appears to more closely resemble normal samples than other malignant samples, the time-delay embedding technique according to embodiments of the technique is able to separate out the underlying dynamical systems, such that the GTM algorithm is able to correctly distinguish between the normal and malignant traces.

As discussed supra prior art clustering approaches require a non-trivial amount of preprocessing of the data, for example removing trends, performing normalization, etc as well as executing the actual clustering algorithm. In contrast the technique presented in this specification according to an embodiment of the invention works directly with the raw measurement data, and the clustering process required only approximately 3 minutes of computation on a standard desktop computer to classify all 40 patients heartbeats.

B2: Nearest-Neighbour Classification:

The inventors have also assessed the performance of the GTM-based distance embodiment of the invention in conjunction with a nearest-neighbour classifier. Accordingly the "Yoga" dataset from the UCR time series database, see Keogh et al "The UCR Time Series Classification/Clustering Homepage" (http://www.cs.ucr.edu/~eamonn/time_series_data/) was employed which contains a number of time series and sequential datasets, together with accuracy results for nearest-neighbour classifiers using the Euclidean distance between raw segments of time series, and nearest-neighbour classifiers using the Euclidean distance between segments that had been previously aligned with dynamic time warping (DTW).

The "Yoga" dataset is composed of a set of pseudo-time series segments generated by concatenating features derived from images of a male and a female performing a set of Yoga poses. For each image, the outline of the figure in the image is computed, and then the distance from the center to each pixel along the boundary of the figure is computed. The sequence of these values for each pixel on the boundary of the figure constitutes a single segment of data. Accordingly the problem is, given these sequences, to determine whether the male or female subject was present in the image at each point in time. We call this a pseudo-time series problem because the sequence of data points come from a single image, where the temporal component is introduced by the act of tracing the pixels around the figure in the image. While this does not strictly constitute a time series in which the data comes from sequential observations of a periodic nonlinear dynamical system, such data sets are relatively common and hence the inventors wish to see how GTM performs on it and to test its robustness to assumption violations. The data is already partitioned into a training set of 300 examples and a testing set of 3000 examples. To mimic the experimental setup on which the results of the UCR database are reported, these sets were used as presented without pre-processing.

Accordingly, a 1-nearest-neighbour classification was performed using the GTM distance measurement technique according to an embodiment of the invention. The approach employed a "leave-one-out" cross validation technique to find optimal time-delay parameters on the training set. Using the parameters $m=5$ and $\tau=13$ for the time-delay embedding, and parameters $M=8$ and $k=4$ for GTM, an accuracy of 85.8% was achieved on the test set. The UCR time series page reports the accuracy of a 1-nearest-neighbour classifier as 83.0%, and that of DTW with the optimal warping window as 84.5%. It should be noted that DTW is more suited, by design, for this problem as the data is already segmented, the segments are short, and the problem is to find a single matching pattern or motif in pairs of segments. Accordingly, the robustness of the GTM approach according to the embodiments of the invention as presented by the inventors is demonstrated as it still produces slightly better results in this setting.

B3: Semi-Supervised Learning:

It would be evident that it is often much easier to collect unlabeled data than labeled data as obtaining labels may be time-consuming or costly due to the need for human experts. Accordingly, rather than either discarding unlabeled data or limiting the analysis to only labeled data, semi-supervised learning algorithms have been developed, see for example Chapelle et al in "Semi-Supervised Learning" (MIT Press, 2006) as attempts to augment the labeled training data with unlabeled data. While the labels are required for learning the mapping from features to class label, when there is structure in the feature-space, additional unlabeled data can be useful for learning the structure.

In a semi-supervised setting an assumption is that a small fraction of the data points have labels and the rest are unlabeled. First, we treat all of the data as unlabeled and perform hierarchical clustering, as in the previous section for ECG data, to produce a dendrogram. Next, working from the root node down, in a depth-first manner, each node represents a set of points, some of which may be labeled. If a node contains only one labeled point, or all of the labels on points in the node agree, then we can assign that label to all of the points in the node and cut the dendragram at that point. If there are no labels, then we also cut the tree at that node, but leave the points unlabeled. If there are multiple unique labels in the set of nodes, we move on and consider the children of that node.

Once finished parsing the nodes in the dendrogram then we will have a larger set of labeled nodes, but some unlabeled nodes may remain. In a second pass, labels are assigned to the remaining unlabeled nodes. In order to do this, the distance from each unlabeled node to its nearest labeled neighbour is computed, and the unlabeled node that is closest to a labeled node is assigned the label of its nearest labeled neighbour. If there are remaining unlabeled nodes, then the process is repeated until all nodes have been assigned a labeled neighbour.

For the semi-supervised experiment, we collected data from four individuals, three males and a female, who were asked to perform a sequence of four activities at the gym for approximately 2 minutes each. The activities were using an elliptical machine, riding a stationary bike, using a stationary rowing machine and using a stair-climbing device. The three male subjects also ran on a treadmill, and one of the male subjects only completed the treadmill and biking activities. Data was collected using a software application installed onto an HTC G1 mobile phone which was clipped to the waistband of the subject's clothing. The data was collected from the triaxial acceleration sensor in the HTC G1 at the maximum frequency allowed by the cellular phone's operating system, namely 35 Hz. From the three input channels, x, y, and z, we form a univariate time series by taking the Euclidean vector norm $(x^2+y^2+z^2)^{1/2}$.

The data was manually segmented into the various activities, then split into 5 s windows where the first and last second of each segment overlapped with the previous or next segment, respectively. The first and last 5 s segments were discarded, and a time delay model was built for each 5 s window. This resulted in 27-46 models per activity. There were 689 models in total corresponding to 689 5 s segments. Each segment was labeled according to the subject and activity that took place during the majority of the time period covered by the segment.

Figure 7:
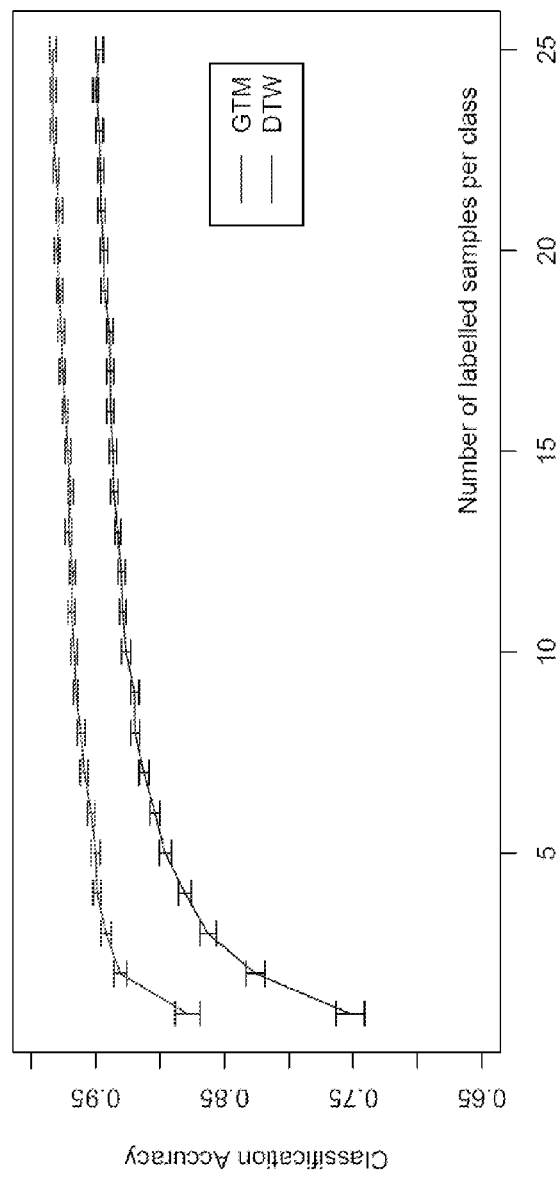
FIG. 7 depicts the result of applying a semi-supervised learning technique to an activity dataset according to an embodiment of the invention.

We started by removing all but n labels from each of the 15 subject-activity pairs. We varied n from 1 to 25, and used the semi-supervised technique with both GTM-based and DTW-based distances. Since we know the correct labels, we are able to assess the accuracy of the labeling and considered the accuracy of labeling both the activity and the subject correctly. For each value of n, the experiment was run 100 times, picking random labels to leave in each time. The results are shown in FIG. 7, where the x-axis represents the number of labeled examples for each class, and the accuracy is computed over data with missing labels. The error bars represent 95% confidence intervals around the mean. It can be seen from FIG. 7 that the GTM approach consistently outperforms DTW for all values of n, and is able to correctly classify the subject and activity with over 90% accuracy with only two labels per subject-activity pair. Reducing the complexity of the problem to only identifying the activity, not the subject, then the performance of GTM and DTW techniques was nearly identical, ranging from 94% accuracy for n=1 to 99% accuracy for n=25.

B4: Discussion:

The results presented above demonstrate the versatility of the GTM distance measure. The inventors have shown that the approach works not only as a means for extracting features from long, un-segmented sequences of time series data but also provides good distance measures for clustering and nearest-neighbour classification. Many problems in time series classification consider datasets that have been manually or otherwise segmented into short sequences, each associated with a particular class label.

The techniques presented by the inventors have shown that when these segments are all of equal length, and when the segmentation is performed so that the patterns sought in the data are temporally aligned between pairs of segments through the time-delay embedding, then treating n length sequences as points in $\Re^n$ and using the Euclidean distance between segments to train a 1-nearest-neighbour classifier is hard to beat, see Keogh et al in "On the Need for Time Series Data Mining Benchmarks: A Survey and Empirical Demonstration" (Data Mining and Knowledge Discovery, Vol. 7(4), 349-371, 2003).

When the patterns in the sequences are out of phase, running an alignment technique such as DTW, see Berndt, can compensate and 1-nearest-neighbour with Euclidean distance between aligned elements also performs well. However, alignment can distort properties of the time series that may be important. This is likely the cause of the poor performance of the DTW methodology on the ECG data, where the differences between the malignant and normal traces can be quite subtle.

Within the semi-supervised experiments, this also explains the poor performance with DTW, relative to GTM, when trying to discriminate between subjects that perform the same activity. The GTM approach, on the other hand, does not distort the temporal properties of the data, while still allowing for the comparison of sequences containing patterns that are out of phase. Additionally, GTM can be used to compare segments of different lengths and containing different numbers of repetitions of a pattern. DTW allows for the comparison of segments with different lengths but, if one segment contains a pattern repeated 5 times, and the other contains the same pattern repeated 4 times, for example, the DTW distance between the two segments will not be useful. For DTW to work well, the data must be well-segmented, with segments containing an equal number of the patterns of interest. Typically, real data is not well-segmented, in which case an approach such as GTM is preferable.

The computation required for comparing two segments of length n with GTM is $O(n \log(n))$, given that building a model takes a duration of $O(n \log(n))$, and then computing the similarity requires $O(n)$ nearest neighbour queries, each requiring duration $O(\log(n))$. DTW, on the other hand, requires $O(n^2)$ time. Considering the ECG clustering example supra then the 40×40 GTM distance matrix took approximately 190 seconds to compute, whilst the DTW distance matrix took approximately 426 seconds. For the semi-supervised experiment supra in respect of establishing the activity and subject, the 689×689 GTM distance matrix took approximately 36 minutes to compute, while DTW took approximately 70 minutes. In practice, approaches such as approximate nearest neighbor, see Indyk et al in "Approximate Nearest Neighbors: Towards Removing the Curse of Dimensionality" (Proc. ACM Symposium on Theory of Computing. pp. 604-613, 1998), can be used to speed up GTM, and it has also been shown that for large datasets, the cost of DTW, amortized over the dataset is closer to O(n), see Xi et al in "Fast Time Series Classification using Numerosity Reduction" (Proc. Int. Conf. on Machine Learning, pp. 1033-1040, 2006). Hence, in practice both techniques can be quite efficient, and for large datasets both algorithms are easily parallelizable.

B5: Boosted Time-Delay Classifiers:

The majority of work on classifying and clustering time series, including the experiments performed supra for embodiments of the invention, focus on short, segmented sequences of data. For example, the datasets in the UCR time series database, see Keogh, range from lengths of 60 to 637 samples. However, for many real-world problems including but not limited to activity recognition from wearable sensor data, see the inventors, Lester and Subramanya, heart rate and breathing monitoring, seizure detection, and financial prediction, the data is a long time series that has not been segmented a priori. Instead of looking at a set of short segments and trying to assign a single label to each segment, for these other datasets, the goal is to identify segments in a long time series that correspond to a particular class or deviate from a particular class. Accordingly, the inventors present the GTM algorithm as a feature extraction technique for exactly this kind of problem. However, the issue of how to choose segments on which to build time-delay embedding model is not addressed within this prior art. Rather the segments on which to build models are selected randomly.

It would be beneficial therefore to have an algorithm that selects models from the training data in a directed manner.

B6: TDEBOOST:

The inventors have developed an algorithm called TDE-BOOST for classifying time series. TDEBOOST is based on the SAMME.R algorithm, see Zhu et al "Multiclass Ada-Boost" (Technical Report #430, Department of Statistics, University of Michigan, 2006), which is a boosting algorithm for multi-class classification. It would known to one of skill in the art to which the patent relates that boosting is a powerful ensemble method for classification, exemplified by the Ada-Boost algorithm, see for example "A Decision Theoretic Generalization of On-Line Learning and an Application to Boosting" (Journal of Computer and System Sciences, Vol. 55(1), pp 119-139, 1997). AdaBoost associates a weight with each example in a training set of labeled data $t\langle (x_i, y_i) \rangle_{i=1}^N$. The weights are initially all equal. At each iteration l, a weak classifier $h_l$ is trained on the weighted dataset and then used to classify the entire training set. The weights of misclassified examples are increased. The weights are then renormalized to sum to one, and the next iteration begins. Once a sufficient number of iterations M has been performed, a classifier is formed from a weighted majority vote of the outputs of the weak classifiers trained on each iteration as given in Equation 5.

$$h(x) = \Sigma_{l=1}^M \alpha_l h_l(x) \quad (5)$$

where the weight a for a weak classifier $h_l$ is computed based on its accuracy on the weighted dataset on which it was trained.

The SAMME algorithm, see Zhu, addresses the multi-class problem (i.e., $y_i \in [1, \ldots, K]$), as opposed to breaking it into multiple two-class problems. AdaBoost requires that the weak classifiers have an error rate less than ½ at every iteration; otherwise, the weight for the classifier will be negative, thus taking a step away from the optimal solution. For the K-class problem, this requirement is often hard to satisfy. SAMME uses a correction term in the weight calculation, such that the accuracy of the weak classifier at each round need only be at least 1/K. A recent theoretical result, Mukherjee et al in "A Theory of Multi-Class Boosting" (Conf. Neural Information Processing Systems, Poster T62, 2010), shows that this approach is actually too permissive, and proposes a better theoretical error bound. However, this new method has not yet been thoroughly tested in practice, though initial results are promising. The inventors in embodiments of the invention have based the experiments within this specification on a variant of SAMME called SAMME.R that builds an ensemble of weak classifiers, each of which output a probability distribution (or set of confidence scores) over the class labels, rather than simply selecting a single class label.

The most straightforward approach to implementing boosting in this setting would be to build classifiers directly out of the time-delay embedding models, by taking a collection of models (one for each class) and defining the classifier for a new snippet of data by picking the class with the most similar model. However, this approach can be problematic for time series, especially for the practical applications that the inventors have considered and envision arising in many real-world applications. If the models picked initially are noisy, the weak classifier is bound to have very high error, and even if we continue picking new data segments and re-weighting them, the classifiers will continue to be poor. Thus there is no way to recover from a bad initial model with boosting approaches in the prior art.

Accordingly, the inventors have modified the boosting framework, and we use the time-delay models as feature extractors, providing data for the classifiers. More precisely, at each boosting round, we use the GTM algorithm developed by the inventors with an ensemble of time-delay models, to extract from the time series the features that are used by the weak classifiers. The set of models are allowed to change between boosting rounds, which means that the set of features used by the weak learners also changes. The pseudocode of this method is presented in Algorithm 2.

---

Algorithm 2 TDEBOOST

---

Input: A training set $\langle (o_i, y_i) \rangle_{i=1}^N$, a specified number of rounds L, model and window-length parameters W and s, time-delay embedding parameters m and τ, and a hypothesis class H.
Let N' = N − s + 1, set weights, $w_i = 1/N'$, i = 1,..., N'.
for l = 1,..., L do
  If l = 1, build a set of M time-delay models $M_l$, otherwise update the
    set of models $M_{l−1}$ to produce $M_l$.
  for t = 1,..., N' do
    Build model $v_t$ for subsequence $\langle o_t,..., o_{t+s-1} \rangle$.
    Generate training feature vector $x_t = [S(u_l, v_t),..., S(u_M, v_t)]$,
    Generate class label $y_i = y_t$
  end for
  Fit a classifier $h_l \in H$ to $\langle (x_i, y_i) \rangle_{i=1}^{N'}$ using weights $w_i$.
  For each class label k = 1,..., K, obtain the weighted hypothesis $$g_l^k(x) \leftarrow (K-1)\left(\log(h_l^k(x)) - \frac{1}{K}\sum_{k'=1}^K \log(h_l^{k'}(x))\right)$$

For i = 1,..., N', update the weights $$w_i \leftarrow w_i \, \exp\left(-\frac{K-1}{K}\sum_{k=1}^K \left(-\frac{K-1}{K}\right)^{I(y_i \ne k)} h_l^k(x_i)\right)$$

Renormalize the weights $w_i$.
end for
Return: Models $M_1,..., M_L$ and classifier $$h(x) = \arg\max_k \sum_{m=1}^M g_m^k(x)$$

---

The training set $\langle (o_i, y_i) \rangle_{i=1}^N$ consists of a univariate time series with $o_i \in \Re$ and the corresponding class labels $y_i \in [1, \ldots, K]$. Unlike a standard supervised learning setup, the values $o_i$ are not assumed to be drawn independently from some distribution. Instead, they are observations of an underlying dynamical system over time.

The algorithm begins by generating a set of M models $M=(u_1, \ldots, u_M)$. Each model $u_i$ is generated by first selecting an index j at random or according to some application-specific criteria, and constructing a time-delay model for the subsequence $\langle o_j, \ldots, o_{j+w-1} \rangle$, where W is a model-size parameter. The set of models M is used to extract an M-dimensional feature vector $x_t$ by constructing a time-delay model v from the subsequence $\langle o_t, \ldots, o_{t+w-1} \rangle$, where s is the segment-length parameter, and for i=1, ..., M setting element i of vector $x_t$ to be $S(u_i, v)$. In other words, the feature vector for time t represents the set of similarity scores between each of the models in M and the model for the subsequence of length s starting at time t. The feature vector and class label pairs $(x_t, y_t)$ are then used to train a classifier, exactly as in the SAMME.R algorithm. Note that the feature vector $x_t$ is built from a window of observations starting at $o_t$; one could also consider using the mode of the class labels within this window, rather than the label of the first observation, $y_t$, as the target for training the classifier.

We use the notation $h_m^k(x)$ to denote the probability assigned to class k by the hypothesis built at round m when evaluated on input feature x. Classifiers that output only a class label can be used by modifying the SAMME algorithm in the same way that we modified SAMME.R. We also experimented with the SAMME variant, but found that modifying SAMME.R gave better performance on the problems considered in this specification.

At each iteration, the set of models M is updated. This step can be application specific. The easiest approach is to generate a new set of models at each step, either by randomly sampling new segments, or by another method. Alternatively, specific models can be replaced by new models. In gait recognition, discussed in more detailed in the following section, the set of models M contains one model for each class, and at each iteration one model is selected and replaced by a new model for the same class. The choice of model is informed by the current boosting weights: we select a segment of the data on which the boosting weights (i.e., the cumulative training error) is high. Based on the assumption that short subsequences of training points are likely to all have the same label, the intuition here is that by building models for regions of the time series in which performance is poor, the features corresponding to these models will focus the ensemble hypothesis on these "harder" regions, and improve overall classification.

The algorithm differs from classical boosting because of this feature selection step that precedes the construction of the weak classifiers. The theory of boosting still applies to this scenario, consider the class of weak classifiers where all possible models are included as features in a linear classifier. In this case, minimizing the error on the new distribution is equivalent to increasing the parameter (in the linear classifier) of the nearest examples to those with high weights in the boosted distribution. However, from a computational point of view, we cannot afford to include a large set of models in the classifier. Hence, what we do can be viewed as setting to 0 the weight of our existing model and picking proactively the area that most reduces training error. This is an approximation to the previous case (when all models are included) but is still guaranteed to reduce error on the boosting distribution. Since this is the main requirement of boosting theory, existing results still apply.

B7: Walking Dataset:

The problem of identifying an individual using data collected from a wearable accelerometer sensor is a challenging task for time series classification algorithms. This problem, called gait recognition, has been studied by a number of research groups. However, evaluations of these techniques consider data collected in very controlled environments. For example Ailisto et al in "Identifying People from Gait Pattern with Accelerometers" (SPIE Conf. Biometric Technology for Human Identification, Vol. 5779, pp 7-14, 2005), Gafurov and the inventors both collected datasets composed of subjects walking a distance of approximately 20 m, in a straight line, on a level surface, with a sensor carefully attached to a specific body part. Likewise Bachlin et al in "Quantifying Gait Symmetry: User Authentication and Real-World Challenge" (ICB '09 Proc. 3rd International. Conf. on Advances in Biometrics, pp 1040-1049, 2009) collected data from subjects walking in a controlled manner, in this instance on a treadmill so that the speed could also be controlled.

It should be noted that due to the personal nature of the data, it is typically not shared between groups, and while each of the proposed methods performs well on the data collected by the corresponding authors, thorough comparisons between methods on the same dataset are rarely performed. Additionally, since these algorithms have potential for commercialization, authors in this community are hesitant to share code, making empirical comparisons difficult.

In order to overcome limitations of existing empirical evaluations, we present a dataset that was collected in real circumstances, analogous to the environment in which a practical gait recognition algorithm would operate. Further, the inventors are making the dataset publicly available in the hope that it will provide a challenging benchmark for gait recognition as well as machine learning research. The data was collected from 20 subjects, 10 males and 10 females, ranging in age from 19 to 35, ranging in weights from 47 kg to 100 kg, and ranging in heights from 160 cm to 193 cm. Each subject was asked to carry an HTC Nexus One mobile phone in their pocket and walk around outdoors for 15 minutes, then return on a subsequent day to perform another 15 minute walk. The subjects were allowed to change clothing and footwear between the two days at their discretion, and the phone was casually placed in the pocket, rather than being affixed at a specific position. Subjects were also asked to walk in their 15 minutes both on grass and concrete surfaces, up and down hills, and to pause occasionally. The device also logged GPS data so we could verify that the subjects followed their instructions. Specific details, as well as descriptions of the footwear and clothing worn by the subjects are included in the dataset accessible publicly.

The HTC Nexus One phone runs the Google Android operating system and the data acquisition was performed by a custom application that collects data from the sensors as quickly as the operating system can provide it. This sampling frequency is variable, and depends on factors such as the processor load, which represents a significant variation from controlled environment test conditions in the prior art, as such an application would be anticipated to be just one application in execution as the user uses their portable electronic device for a variety of tasks. The data is time stamped with millisecond precision. In the data collected, the average frequency is approximately 28.57 Hz, with a standard deviation of approximately 4.17 Hz. The frequency is relatively low compared to the data analysed in previous work, but is representative of the frequency that one would expect from a commercial high volume low cost portable wireless device which is computationally poor in resources compared to dedicated instrumentation, laptops, etc.

B7: Discussion:

In the analysis the inventors employed frame-based performance metrics, see Ward et al in "Performance Metrics for Activity Recognition" (ACM Trans. Intelligent Systems Technology, Vol 2, pp 1-23, 2011) as the evaluation criterion.

The data was resampled to a fixed frequency of 25 Hz using linear interpolation, and computed a single magnitude measurement from the three acceleration directions, as in the semi-supervised learning section supra. The data contains segments of walking, as well as segments where the subjects were stationary. A common label, lingering, was associated to all portions of the data, for all subjects, which was determined to be non-walking data. In this analysis a relatively simple but effective method for labeling lingering data was employed wherein we consider a window of 50 samples and if the sum of the absolute values of the acceleration magnitudes in this window was less than 125 m/s$^2$, then the first sample in the window was labeled as lingering. These parameters were determined by trial-and-error, by visually inspecting the resulting labels. It would be evident that other criteria for establishing lingering may be employed. Lingering data was assigned the class label 0, and the subjects were identified with labels 1, . . . , 20. Every sample is assigned a label. After filtering, there are between 18,000 and 50,000 samples per walker, and approximately 87,000 samples for the lingering class overall.

Since every sample has an associated label, and because there is no significant class skew, we can evaluate the performance of a classifier by computing the accuracy, or percentage of samples that are assigned the correct label. When considering a single subject, we report both precision, i.e., the fraction of examples that our algorithm labels as that subject that are correct, and recall, i.e. the fraction of examples that should have been labeled as a certain subject that were correctly labeled.

TDEBOOST was compared with a baseline approach which extracts 159 features used in the activity recognition system Lester, which comprises using Fourier coefficients, cepstral coefficients, and bandpass filter responses over windows ranging from 2 seconds to a minute. Features are associated with the first sample in the window. The features are used to train an AdaBoost. For the weak classifier we selected an M1 classifier, see Freund, with random forests composed of 100 trees, each trained on 10 randomly selected features as the weak classifier. 100 iterations of boosting were performed. We also compared against the existing previously established approach of the inventors, which we call the "bagging" algorithm. The inventors were unable to compare against other gait recognition approaches as they involve segmenting the data into individual footsteps, and these techniques do not scale to large, noisy datasets derived from real world data.

For TDEBOOST a set of 20 models was maintained, one for each subject, and at each round of boosting, the set of models updated by sampling a training example according to the boosting weights. If the sample corresponds to the lingering class, then we resample, and repeat until the sample corresponds to a subject. Let i be the class label associated with the sampled subject; then, a new model u is built from the window of data following the sample that was selected, and it replaces the model corresponding to subject i in the current set of models. As in the baseline approach, we use a random forest with 100 trees, each built on 10 randomly selected features, as the weak classifier. We collected an additional trace of two subjects that did not participate in the large dataset, walking for approximately one minute each; we used this small amount of data to select our parameters. We use the time-delay embedding parameters m=7 and τ=2, which were selected using cross-validation on half of this additional data, fixing the other GTM parameters at initial guesses of W=50 (two seconds) and s=32. Once m and τ were selected, we selected model and window length parameters of W=125 (5 seconds) and s=16, again using cross-validation on the other half of the data. The number of neighbours was k=2, based on the fact that the models were small, and thus contained few gait cycles.

In the results presented TDEBOOST was run for 500 iterations. Although the training error converged after approximately 100 iterations, we wanted to assess whether the algorithm would overfit the data by running past the point at which the training error converged. We considered two scenarios: training on a segment of the data from one day, and testing on the remaining data from that same day; and training and testing on different days. When training and testing on the same day, we performed 10-fold cross-validation, where each fold consisted of a contiguous segment of the data. When training and testing on different days we used the 10 classifiers that were built in the previous scenario (one per round of cross-validation), and evaluated them on all of the data from the day on which they were not trained. Since the baseline algorithm operates with a larger number of features, we subsample 10% of the training data when training the weak classifier. In order to ensure that the results are not an artifact of the data that we sampled, we repeat this 10 times for each fold, and average the results.

Figure 8B:
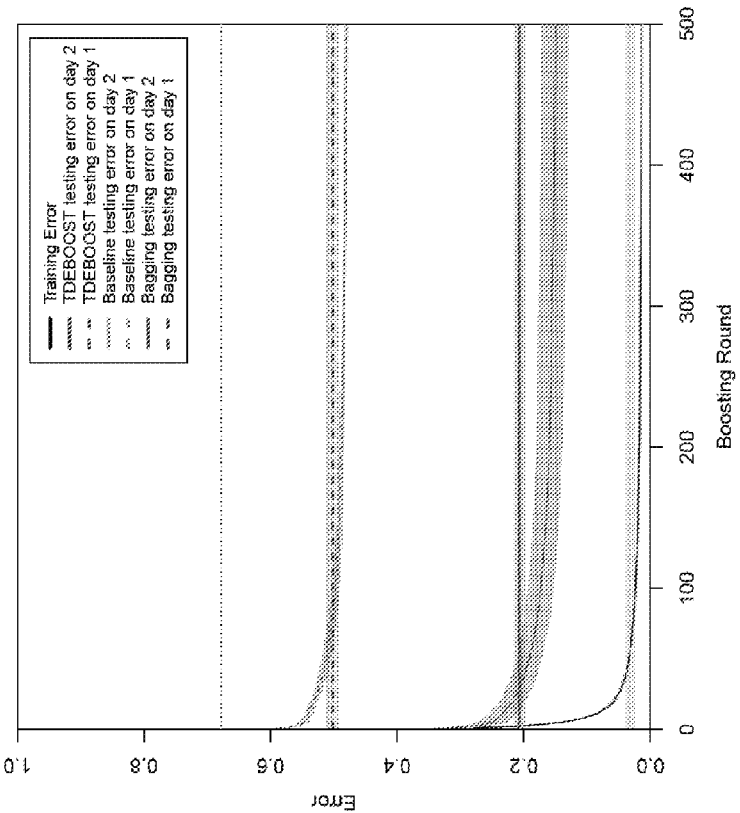
FIGS. 8A and 8B depict learning curves for learning curves for analysis according to an embodiment of the invention together with baseline, and bagging algorithms when classifiers are trained with data from days 1 and 2 respectively.
Figure 8A:
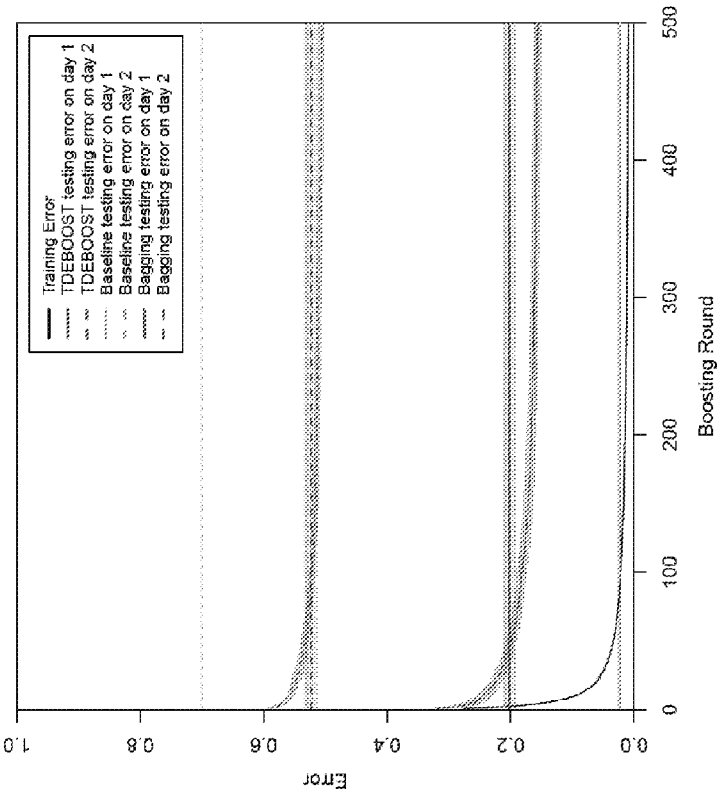

For the bagging algorithm, we use 100 randomly selected training segments (5 per subject) for models, and a random forest classifier with 500 trees. This was repeated 10 times with 10 different sets of models for each of the 10 rounds of cross-validation, and we report the average accuracy (i.e., in total 100 classifiers were built and tested). FIG. 8A shows the results when the classifiers are trained on data collected on the first day, and FIG. 8B shows the results when the classifiers are trained on data from the second day. The training error for TDEBOOST is depicted in black. The blue, green, and red lines depict the testing errors for TDEBOOST, the baseline, and the bagging algorithms, respectively. The solid lines depict the testing error when trained on data from the same day, and the dotted lines depict the testing error when trained on the other day. The shaded regions around the lines represent 95% confidence interval around the mean. All three methods perform significantly worse when the training and testing sets are from different days, confirming the findings Bachlin et al in "Quantifying Gait Similarity: User Authentication and Real-World Challenge" (Lecture Notes in Computer Science, Vol 5558, pp 1040-1049, 2009). If we do not consider the lingering data, the accuracy of TDEBOOST after 500 rounds is 0.42, while the accuracy of the baseline method is 0.20. Chance is 0.05, disregarding the lingering class.

When the classifiers were trained and tested on data from the first day, the average performance of bagging 100 models was roughly equivalent to the performance that TDEBOOST achieved with 45 models, and roughly equivalent to TDEBOOST with only 29 models for the second day. When training and testing on different days, the improvement over bagging was not as drastic, but still significant. When training on day 1 and testing on day 2, bagging with 100 models is roughly equivalent to TDEBOOST with 90 models, and when training on day 2 and testing on day 1, bagging is roughly equivalent to TDEBOOST with 78 models. In both cases, when training and testing on data from the same day, the baseline outperforms both the boosting and bagging approaches, and when training and testing on different days, both boosting and bagging classifiers built with the GTM-based features outperform the baseline.

The training error for TDEBOOST drops quickly, and then continues to slowly decrease. However, the testing error also continues to decrease, which highlights an attractive property of boosting: it is typically not prone to overfitting. When trained and tested on day 2, Class 0 is lingering, and the other classes correspond to the subject identifiers, on the same day, the baseline algorithm outperforms TDEBOOST after 100 rounds by approximately 0.15. On the other hand, when the training and testing data come from different days, TDEBOOST outperforms the baseline by approximately 0.18. After 500 rounds, TDEBOOST is able to build a classifier from the data collected on one day and label over half of the data from the other day correctly.

Figure 9:
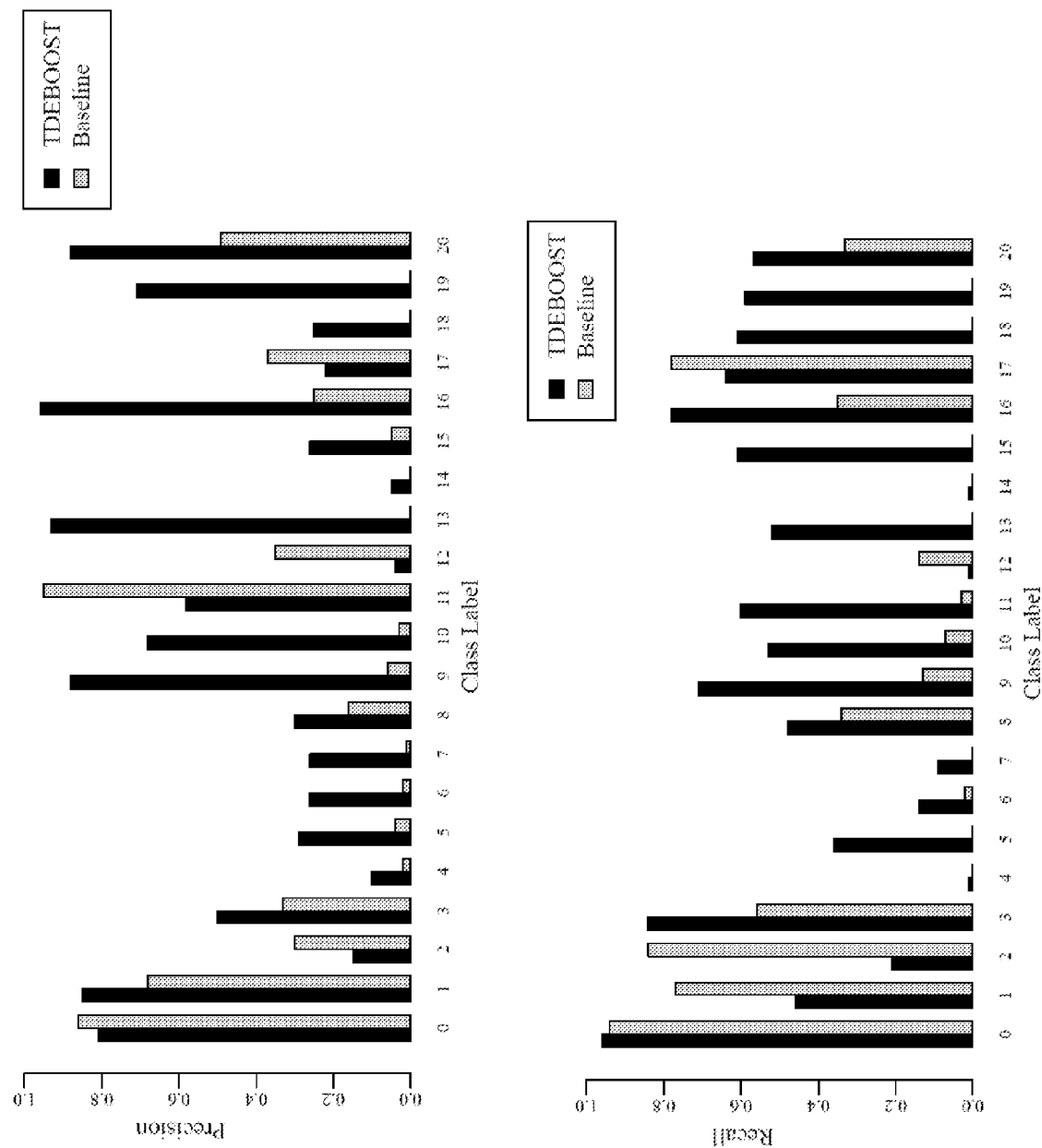
FIG. 9 depicts precision and recall results respectively for analysis according to an embodiment of the invention together with baseline algorithm results when training on day 1 and testing on day 2.

We can gain more insight into the performance differences by looking at the average precision and recall values for particular classes. For example, FIG. 9 shows these values when the training data is from day 1, and the testing data is from day 2. Lingering is labeled as class 0. Assuming the task is to identify a particular user of the device, then loosely speaking, precision gives a measure of how often the person that is identified as the user is in fact the real user, and recall gives a measure of how often the real user is correctly identified when they carry the phone. In other words, (1—precision) tells us how often an impostor is recognized as the real user, and (1—recall) tells us how often the real user is thought to be someone else.

There are 11 subjects on which the precision for the baseline is less than 0.1, but only 3 for which TDEBOOST has a precision less than 0.1. TDEBOOST achieves higher scores for both precision and recall than the baseline on 15 of the 20 subjects, while the baseline achieves higher scores for both precision and recall on only 3 of the subjects. Subjects 4 and 14 were poorly classified by both algorithms, and these are the two subjects for which the change in clothing between day 1 and day 2 was most drastic; Subject 4 changed from a loose flowing dress to tight shorts, and subject 14 changed from jeans to baggy shorts. It would be apparent that collecting data over many days could substantially improve performance as would asking the user to limit clothing changes for an initial period of time.

A subsequent analysis was performed with an additional post-processing step performed in order to smooth the labels. The approach adopted was relatively simple, and was based on the assumption that in normal activities walking segments are separated by segments of lingering. Therefore, whenever a segment of data is encountered that has been labeled as something other than lingering, the algorithm begins to accumulate counts for each label, and reassigns to the sample the label with the majority vote. This continues until a sample that is labeled as lingering is encountered, in which case the counters are reset.

With this simple smoothing approach, for the case where the classifier is trained on data from day 1 and tested on data from day 2, the average accuracy for TDEBOOST increases from approximately 49.4% to approximately 63.0%, while the accuracy for the baseline decreases from approximately 29.5% to approximately 27.4%. Finally, we compared against a nearest-neighbour approach technique. A classifier was constructed with 2,000 randomly selected windows of 70 samples. The number 2,000 was chosen so that the nearest-neighbour classifier has roughly 50 times as many training points as are in the 120 time-delay models used for 100 rounds of TDEBOOST. Each window was associated with the class label that corresponded to the majority of the samples in the window. The experiment was repeated 100 times and the accuracy for training on day 1 and testing on day 2 was approximately 42.4% and training on day 2 and testing on 1 was approximately 41.5%. These values are roughly equivalent to the accuracy of TDEBOOST after the first round, with 20 models (each one roughly the size of four 70-sample windows) selected at random. It is interesting, however, that these accuracies are higher than the baseline accuracies of 32.2% and 29.9% for training on day 1, testing on day 2 and training on day 2, testing on day 1, respectively. In the gait recognition task, our proposed classification algorithm achieves 100% test set accuracy on a noisy data set consisting of 25 individuals. Not only is the accuracy high, the algorithm is efficient enough that it can classify in real time, on a mobile phone.

While we focus on the problem of activity recognition, the usefulness of these methods for reconstructing a state representation for any data generated by a nonlinear dynamical system should be evident to one skilled the art for a broad range of applications. This includes modeling of state spaces and dynamics for partially observable systems, often considered in reinforcement learning. There are some obvious steps to produce an industrial strength activity recognition system. Using additional methods such as hidden Markov models to perform temporal smoothing of the classifier output, and testing other types of discriminative classifiers are obvious next steps in this process. It would be evident that by incorporating other types of sensors, such as GPS, audio, and video, to provide further context to the time-series data that these approaches may be extended to recognizing higher-level activities.

Within this specification the use of a GTM-based distance measure for time series analysis in unsupervised, semi-supervised, and supervised learning frameworks has been presented. The GTM approach compared favourably to the other commonly used time series distance measures, such as those based on discrete time warping (DTW), discrete Fourier transforms (DFT), and discrete wavelet transforms (DWT).

On some time series data, wherein the differences between the time series data from different classifications is subtle, for example the ECG dataset, the GTM-based distance was the only method able to correctly cluster the data without error. The inventors have also presented techniques for larger datasets that are not segmented a priori, an algorithm (TDEBOOST) that is able to locate segments of the data on which to build models for extracting GTM features. TDEBOOST performs better than the previous prior art approach of randomly selecting models. On the difficult problem of gait recognition when trained and tested with clothing and footwear variations, TDEBOOST outperforms existing activity recognition algorithms. Additionally, the experiments confirm nearest-neighbour techniques are a strong competitor for time series classification, outperforming state-of-the-art techniques based on linear signal processing.

It should be pointed out that GTM is not a replacement for DTW or other approaches for comparing time series. Rather, GTM makes different assumptions about the process that is generating the data, and is therefore applicable for problems where the data corresponds to measurements of a latent, periodic, nonlinear dynamical system. As demonstrated by the inventors in this specification GTM performs very well when its assumptions are met, but it is also robust to violations of these assumptions as well. GTM is also more computationally efficient than DTW, thus making it more suitable for real-time analysis of streaming data such as exists in many real world applications as well as those deployed on computationally poor platforms such as consumer portable electronic devices.

It would be evident that in addition to the applications described within the above specification that many other applications exist to extract time series data from sensors within consumer portable electronic devices as they exist today, as they evolve as well as being provided in application specific devices or sensors interfacing to consumer portable electronic devices exploiting wired and wireless interfaces. Such applications may include for example health monitoring, determination of characteristics of an individual (e.g. ventricular arrhythmia), and security.

It would be evident that the analysis methods according to embodiments of the invention are very general. Essentially, any repeated measurements of a complex system can be analysed including for example but not limited to weather systems, measured for example by thermometers, humidity sensors, barometric pressure sensors, etc; physiological systems, measured for example by ECG, EEG, EKG, accelerometers, heart rate monitors, thermometers, any sensors that monitor levels of compounds in the blood such as oxygen, glucose levels, etc.; radiation level monitoring; power consumption by components in an electronic system; acoustic signal analysis to identify particular sounds within the acoustic signal; network performance; wireless link performance; etc. Essentially any system in combination with a sensor and a computer system reading the sensor can be analysed as a data is read by the computer and this new data then compared against segments that previously stored, provided that the sensors are providing continuously providing updated data.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method comprising:
    receiving at a computer system time series data, the time series data being measurements of a non-linear dynamic system;
    generating with the computer system a time-series data segment comprising a predetermined portion of said time series data;
    generating with the computer system time-delay data, the time-delay data being the result of applying a time-delay embedding model to the time-series data segment a time delay embedded representation of the time series data segment; and
    processing with the computer system the time-delay data with a classifier to generate at least a score of a plurality of scores, each score relating to a measure of the match of the time-delay data to a model of a plurality of models, wherein each model of the plurality of models is a time-delay embedding model;
    wherein the computer system maintains a buffer of at least a predetermined number of samples established in dependence upon parameters defining a time-delay embedding function which generates a matrix whose columns form a sequence of points in a multi-dimensional Euclidean model space; and
    the classifier generates a new score once the predetermined number of samples of new data becomes available.

2. The method according to claim 1, wherein
    the time delay embedding model transforms the time series data into a matrix of time dependent sets of data.

3. The method according to claim 1, wherein
    the model of the plurality of models is at least one of generated by generating a time-delay embedded representation of a short segment of prior time series data established during a training process.

4. The method according to claim 1, wherein
    the model of the plurality of models is at least one of selected in a directed manner by the classifier, established through geometric template matching, and varied after an iteration of a classification process within the classifier.

5. The method according to claim 1, wherein
    the classifier at least one of selects models in a predetermined manner, selectively focuses on data segments requiring classification, operates on different length segments of time series data, and operates on different numbers of repetitions of a pattern within the time series data.

6. The method according to claim 1, wherein
    the classifier is a non-arametric classifier established building time-delay models from short segments of time series data chosen at random from a training data set.

7. The method according to claim 1, wherein the classifier is a non-parametric classifier that exploits a geometric template matching algorithm which computes nearest neighbours between the time-delay data and time series data of a time-delay reconstruction of the model of the plurality of models.

8. The method according to claim 1, wherein
    the generating and processing are performed in real time upon the computer system; and the time series data is generated by at least one of a sensor and an interface circuit interfaced to a sensor.

9. A non-transitory tangible computer readable medium encoding a computer program, the computer program for execution by a computer system, the computer program relating to a method comprising:
    receiving at a computer system time series data, the time series data being measurements of a non-linear dynamic system;
    generating with the computer system a time-series data segment comprising a predetermined portion of said time series data;
    generating with the computer system time-delay data, the time-delay data being the result of applying a time-delay embedding model to the time-series data segment; and
    processing with the computer system the time-delay data with a classifier to generate at least a score of a plurality of scores, each score relating to a measure of the match of the time-delay data to a model of a plurality of models, wherein each model of the plurality of models is a time-delay embedding model;
    wherein the computer system maintains a buffer of at least a predetermined number of samples established in dependence upon parameters defining a time-delay embedding function which generates a matrix whose columns form a sequence of points in a multi-dimensional Euclidean model space; and
    the classifier generates a new score once the predetermined number of samples of new data becomes available.

10. The non-transitory tangible computer readable medium encoding a computer program according to claim 9, wherein
    the time delay embedding model transforms the time series data into a matrix of time dependent sets of data.

11. The non-transitory tangible computer readable medium encoding a computer program according to claim 9, wherein
    the model of the plurality of models is at least one of generated by generating a time-delay embedded representation of a short segment of prior time series data established during a training process.

12. The non-transitory tangible computer readable medium encoding a computer program according to claim 9, wherein the model of the plurality of models is at least one of selected in a directed manner by the classifier, established through geometric template matching, and varied after an iteration of a classification process within the classifier.

13. The non-transitory tangible computer readable medium encoding a computer program according to claim 9, wherein the classifier at least one of selects models in a predetermined manner, selectively focuses on data segments requiring classification, operates on different length segments of time series data, and operates on different numbers of repetitions of a pattern within the time series data.

14. The non-transitory tangible computer readable medium encoding a computer program according to claim 9, wherein the classifier is a non-arametric classifier established building time-delay models from short segments of time series data chosen at random from a training data set.

15. The non-transitory tangible computer readable medium encoding a computer program according to claim 9, wherein the classifier is a non-parametric classifier that exploits a geometric template matching algorithm which computes nearest neighbours between the time-delay data and time series data of a time-delay reconstruction of the model of the plurality of models.

16. The non-transitory tangible computer readable medium encoding a computer program according to claim 9, wherein the generating and processing are performed in real time upon the computer system; and the time series data is generated by at least one of a sensor and an interface circuit interfaced to a sensor.

17. A method comprising:

providing a non-parametric classifier for generating a score relating to a measure of a match of time-delay data to a model of a plurality of models;

wherein the time-delay data is a time-delay embedded representation of a time series data segment and the model is a time delay embedding model transforming time series data into a matrix of time dependent sets of data, whose columns form a sequence of points in a multi-dimensional Euclidean model space;

wherein the non-parametric classifier is established by building time-delay models from short segments of time series data chosen at random from a training data set, and exploits a geometric template matching algorithm which computes nearest neighbours between the time-delay data and time series data of a time-delay reconstruction of the model of the plurality of models.

18. The method according to claim 17, wherein the time series data segment is a predetermined portion of time series data generated by a sensor interfaced to the computer system, and the model of the plurality of models is at least one of generated by generating a time-delay embedded representation of a short segment of prior time series data established during a training process.

\* \* \* \* \*